(12) United States Patent
Rudolph et al.

(10) Patent No.: US 7,594,188 B2
(45) Date of Patent: Sep. 22, 2009

(54) OPERATING MENU FOR A SURGICAL MICROSCOPE

(75) Inventors: Frank Rudolph, Aalen (DE); Karlheinz Hermann, Aalen (DE); Martin Schneider, Königsbronn (DE); Stefan Ernsperger, Ellwangen (DE)

(73) Assignee: Carl Zeiss AG, Oberkochen (DE)

( * ) Notice: Subject to any disclaimer, the term of this patent is extended or adjusted under 35 U.S.C. 154(b) by 601 days.

(21) Appl. No.: 10/922,975

(22) Filed: Aug. 23, 2004

(65) Prior Publication Data

US 2005/0041282 A1 Feb. 24, 2005

(30) Foreign Application Priority Data

Aug. 21, 2003 (DE) .................... 103 38 499
Mar. 5, 2004 (DE) .................. 10 2004 010 773
Jul. 9, 2004 (DE) .................. 10 2004 033 194

(51) Int. Cl.
 *G06F 3/048* (2006.01)
(52) U.S. Cl. ............... 715/810; 715/828; 715/829; 715/835; 715/840; 715/841; 359/368; 359/382; 359/383; 359/384; 359/391; 359/630; 359/809; 359/810; 359/815; 359/819; 382/128; 348/79; 607/88

(58) Field of Classification Search .......... 715/810, 715/828, 829, 835, 840, 841, 845; 359/368, 359/382, 383, 384, 391, 630, 809, 810, 815, 359/819; 382/128; 348/79, 143; 607/88
See application file for complete search history.

(56) References Cited

U.S. PATENT DOCUMENTS

| 5,161,535 | A | * | 11/1992 | Short et al. | ................. | 600/437 |
| 5,982,532 | A | * | 11/1999 | Mittelstadt et al. | .......... | 359/368 |
| 6,063,030 | A | * | 5/2000 | Vara et al. | ................... | 600/437 |
| 6,129,319 | A | * | 10/2000 | Metelski | ................. | 248/123.2 |
| 2007/0206843 | A1 | * | 9/2007 | Douglass et al. | ............ | 382/128 |

* cited by examiner

*Primary Examiner*—Weilun Lo
*Assistant Examiner*—Rashedul Hassan
(74) *Attorney, Agent, or Firm*—Walter Ottesen

(57) ABSTRACT

An operating menu is provided for display with a touch-sensitive display screen (105) in a surgical microscope (100). The operating menu has a first operator-controlled area (106) wherein at least one touch-sensitive actuation field (107) is provided for adjusting a surgical microscope operating mode. In a second operator-controlled area (108) of the operating menu, a touch-sensitive actuation field (109) is provided with a function dependent upon an adjusted surgical microscope operating mode.

33 Claims, 20 Drawing Sheets

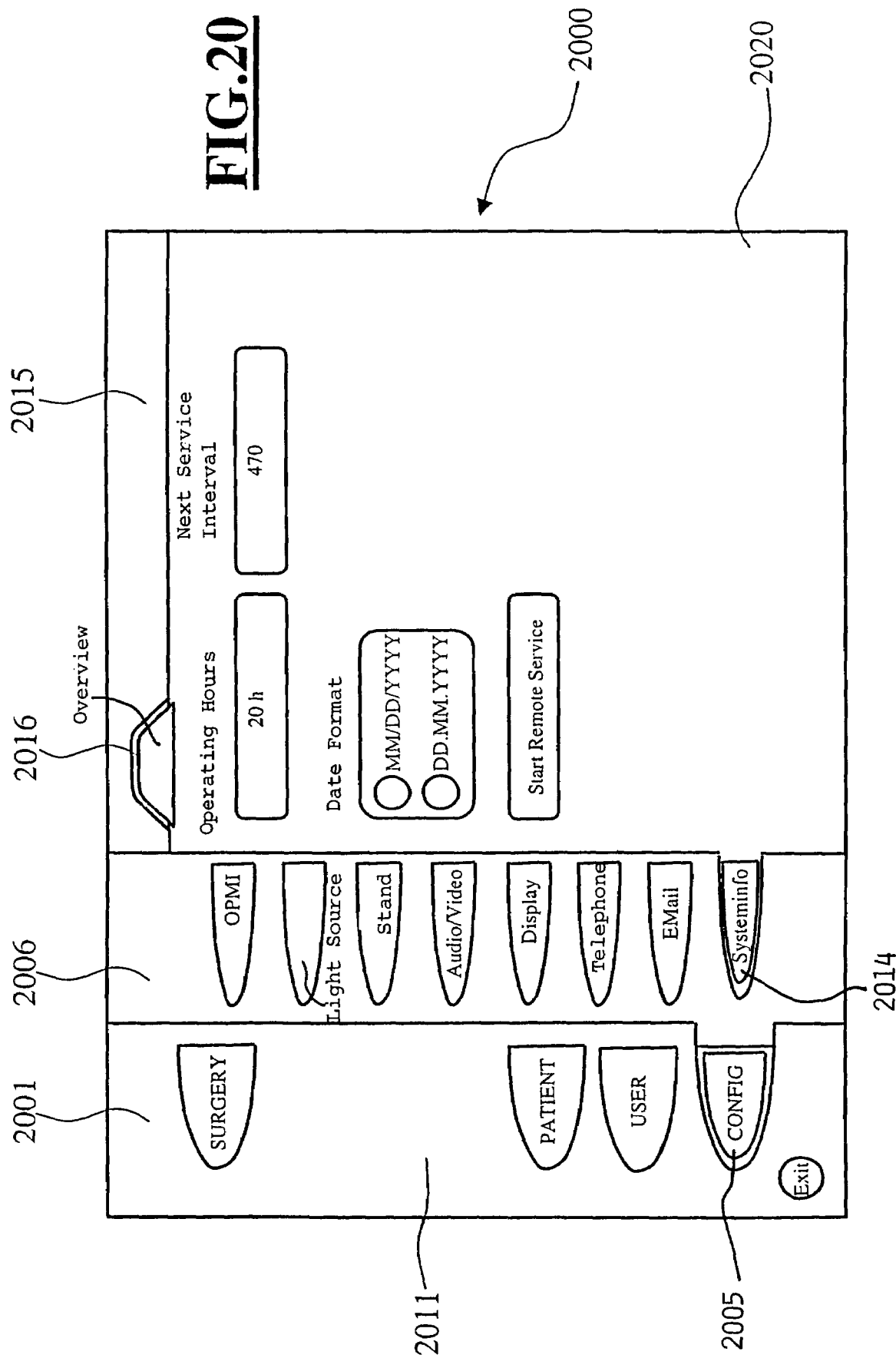

OPERATING MENU FOR A SURGICAL MICROSCOPE

CROSS REFERENCE TO RELATED APPLICATIONS

This application claims priority of German patent application nos. 103 38 499.5, 10 2004 010 773.4 and 10 2004 033 194.4, filed Aug. 21, 2003, Mar. 5, 2004 and Jul. 9, 2004, respectively, the entire contents of which are incorporated herein by reference.

FIELD OF THE INVENTION

The invention relates to an operating menu for control functions in a surgical microscope which is displayed with a touch-sensitive display screen on the surgical microscope. The invention further relates to a surgical microscope having a touch-sensitive display screen which displays such an operating menu as well as a computer program for displaying such an operating menu on a touch-sensitive display screen.

BACKGROUND OF THE INVENTION

Carl Zeiss AG markets a surgical microscope system under the product identification of "Surgical Microscope System NC 33". The surgical microscope system has a touch-sensitive display screen which is mounted on a stand of a surgical microscope. A series of microscope functions can be controlled via this touch-sensitive display screen. These microscope functions include the assignment of actuating keys on a handle, the selection of an autobalance mode for the stand, the preselection of user-defined apparatus adjustments and the actuation of illumination.

SUMMARY OF THE INVENTION

It is an object of the invention to make possible the operation of complex apparatus functions in a surgical microscope on a small area and in an overview manner.

The object of the invention is solved with the operating menu of the kind referred to above which has a first operator-controlled area in which at least one touch-sensitive field is provided for adjusting a surgical microscope operating mode and which operating menu has a second operating area which includes at least one touch-sensitive actuation field having a functionality dependent upon an adjusted surgical microscope operating mode.

In this way, an operating menu for controlling a surgical microscope is made available which makes possible a change of the surgical microscope operating mode at any time via a simple press of the finger.

A surgical microscope, which can be controlled via such an operating menu, can be operated in an especially user-friendly manner. Such an operating menu can be generated with a computer program which is stored in a central control computer of a surgical microscope. Such a computer program makes possible user-adapted configurations for a surgical microscope system with little complexity.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
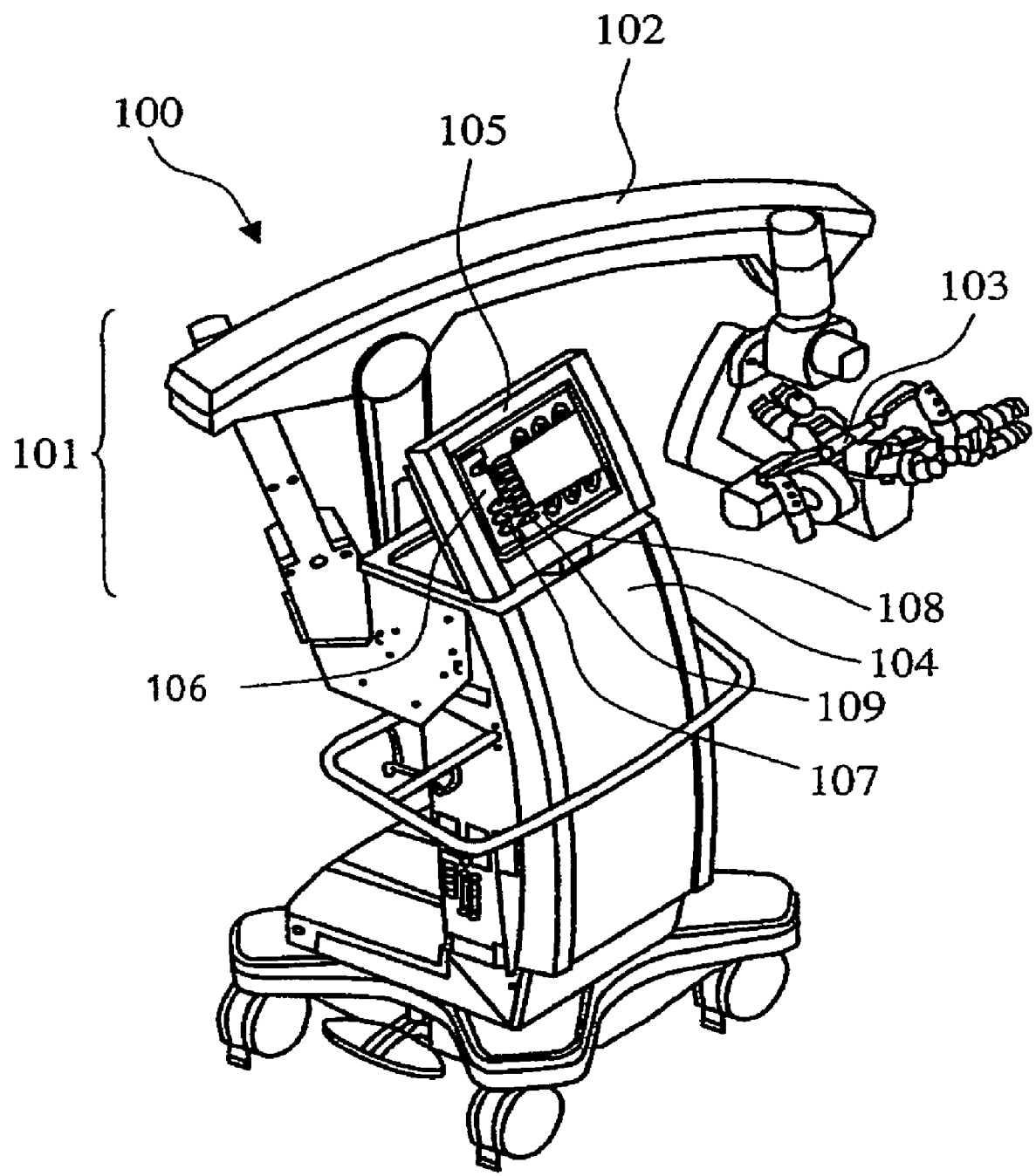
FIG. 1 is a perspective view of a surgical microscope having a touch-sensitive display screen and an operating menu for control functions.

FIG. 1 shows a surgical microscope 100 having a stand unit 101. The stand unit includes a carrier arm 102 on which a surgical microscope body 103 is mounted. The stand unit 101 is accommodated on a console 104 wherein a central computer is disposed. On the console 104, a touch-sensitive display screen or touch screen monitor 105 is attached with which an operating menu for the surgical menu can be displayed. This touch-sensitive display screen is configured as a video-capable graphic display screen and is connected to a central communication interface of the system. In this way, access to data banks is provided and the possibility of network and internet connections or the execution of service-remote programs is made possible. In order to ensure a good pressure sensitivity, the graphic display of the display screen is covered with a thin plastic cover. The display screen 105 itself can be rotated by approximately ±90° on the console 104 and is, at the same time, tiltable by approximately 20° so that the display can be viewed at any time by one or several persons.

The operating menu on the touch-sensitive display screen 105 shows selected functions and settings. The input takes place directly by pressing on a corresponding activatable area on the display screen.

In this way, for the surgical microscope 100, adjustments of the optics in the surgical microscope body 103 can be undertaken via the touch-sensitive display screen. These adjustments relate to the stand, an illumination or programmable part of a manual movement or of a foot switch. It is possible to store selected settings in dependence upon user.

It is especially possible to trigger an automatic balancing of the system via the touch-sensitive display screen. An xy-motor system can be controlled and video and audio functions can be actuated and a data reflect-in display can be switched in.

The operating menu has a first operating area 106 in which touch-sensitive actuation fields 107 are provided for setting a surgical microscope operating mode. In the surgical microscope shown, the following can be selected: "surgical procedure" for working with the surgical microscope in the context of a surgical procedure on a patient; "patient data input" for reading in and inputting patient data into the central control computer of the surgical microscope; "user data input" for reading in and inputting data of a physician working with the surgical microscope; and, "apparatus configuration" for undertaking preadjustments of the surgical microscope for a later surgical procedure.

At the same time as the first operating area 106, the operating menu shows a second operating area 108 wherein touch-sensitive actuation fields 109 are provided with a functionality dependent upon a set surgical microscope operating mode.

It is possible to do the following with the touch-sensitive display screen 105: image administration and archiving of patient data with protection on CD or DVD; establishing a network connection for transmitting or receiving patient data from or to additional networks. A connection to a hospital network can be established, for example, a network driven by a picture archive communication system. There is also the possibility of allowing a remote service access and e-mail can be transferred to selected addresses or data can be transferred to network drives connected to the central control computer of the surgical microscope. In addition, telephone functions can be controlled with the touch-sensitive display screen and a navigation mode (IGS) can be triggered and, finally, a drape-suction system can be controlled with the touch-sensitive display screen.

Figure 2:
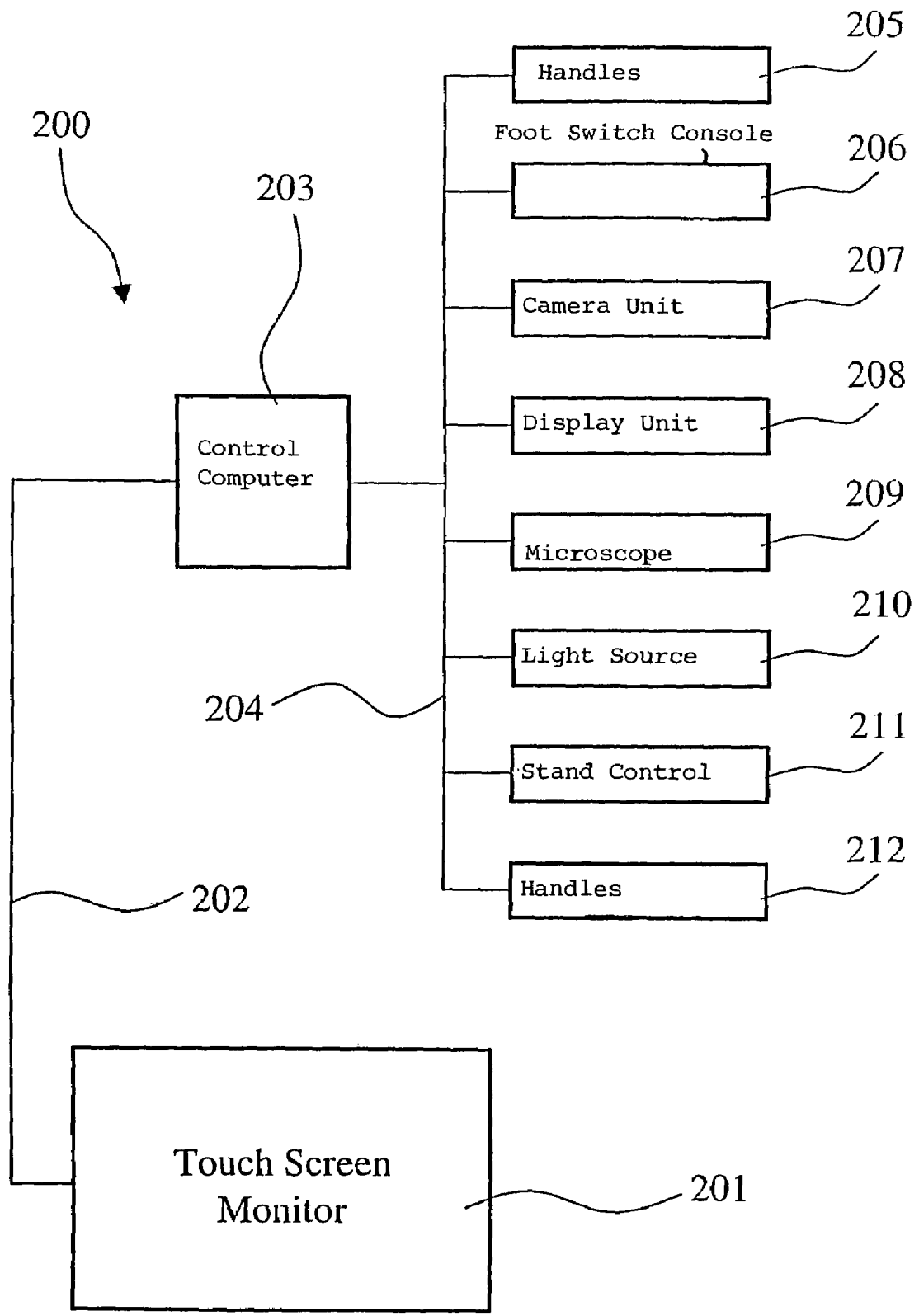
FIG. 2 is a function circuit diagram including a touch-sensitive display screen and a central control computer.

FIG. 2 shows a schematic function circuit diagram 200 which makes possible the interaction of the touch-sensitive display screen with a central control computer and with adjustable apparatus component assemblies of the surgical microscope. The touch-display screen 201 is connected to a control computer 203 via a bi-directional data line 202. Various component groups 205 to 212 are connected to this control computer 203 via a CAN bus line 204. These component groups include a first handle, a foot switch console, a camera unit, a display, a microscope, a light source, a stand control and a second handle. A zoom system of the surgical microscope can, for example, be operator controlled by driving the microscope component assembly and an autofocus can be activated. The stand control of the surgical microscope includes the driving of stand brakes and the option to actuate an xy-displacement device which makes it possible to move the microscope, which is mounted on the stand, in a plane.

With the control signals, which are transmitted via the CAN bus, adjustments can be undertaken on the component assemblies 205 to 212. These control signals make it possible that, for example, actuating motors can be driven in the surgical microscope or video and audio functions can be adjusted.

A computer program is loaded in the control computer 203 which generates an operating menu on the touch-sensitive display screen 201. This menu makes possible a driving of the component assemblies 205 to 212 of the surgical microscope from the operating menu.

Figure 3:
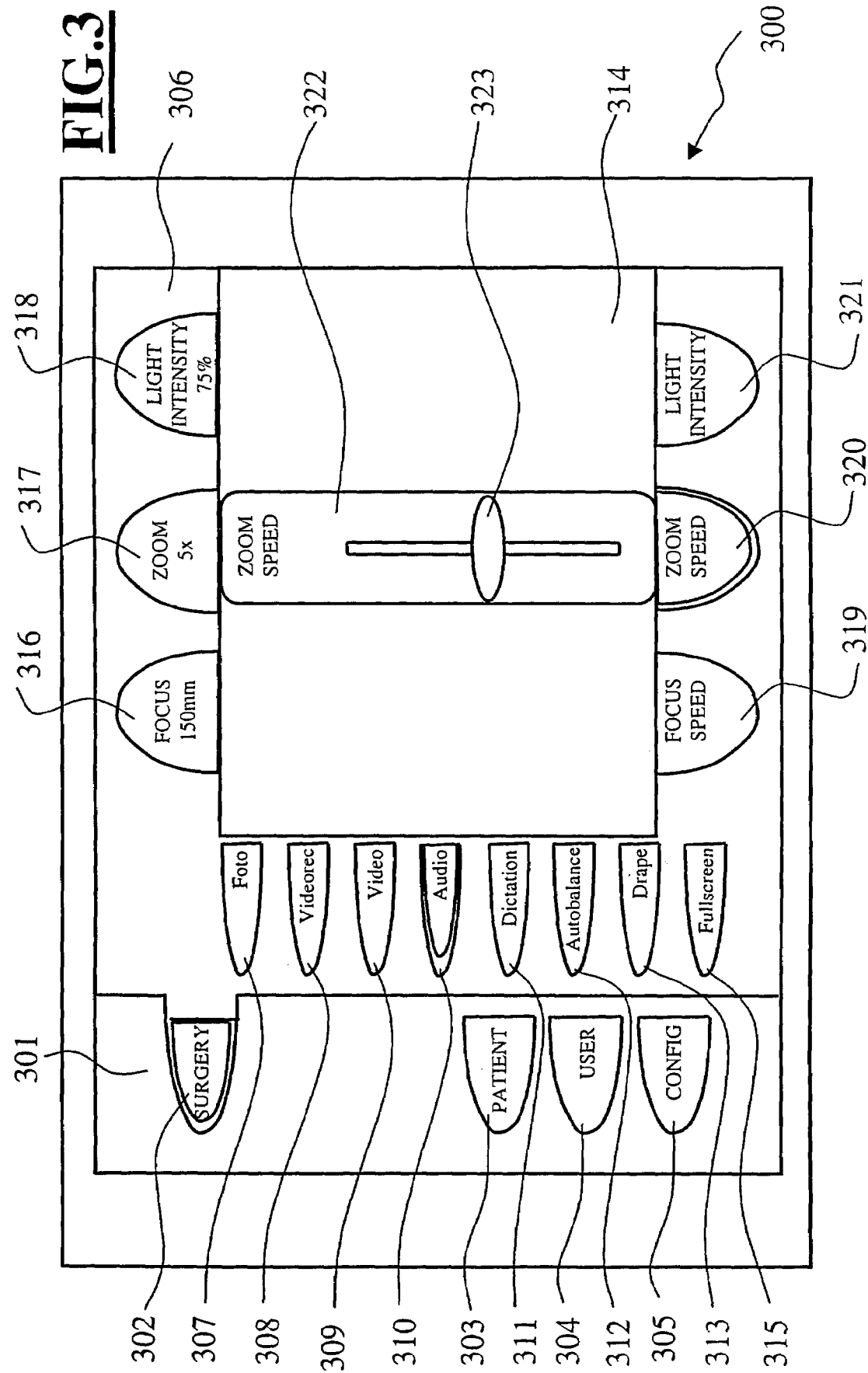
FIG. 3 is an operating menu which is shown by the touch-sensitive display screen for a surgical procedure on a patient; and, FIGS. 4 to 20 show various operating menus for the control of preadjustments in a surgical microscope.

In FIG. 3, the touch-sensitive display screen of the surgical microscope is shown with a displayed operating menu. The displayed operating menu has a first operator-controlled area 301, which shows the touch-sensitive actuation fields 302, 303, 304 and 305. Further, the operating menu includes a second operator-controlled area 306 which is arranged next to the operator-controlled area 301 and is shown at the same time with the operating area 301. The functionality of the operator-controlled area 306 is dependent upon the activation of an actuation field 302, 303, 304 or 305 in the first operating area. In the present case, an actuation field 302 having the function "surgery" is activated on the first operator-controlled area 301. The activation of the actuation field 303 effects the display of a touch-sensitive actuation field for inputting the password. After the corresponding password is inputted, touch-sensitive actuation fields are then displayed which permit access to patient data. With the activation of the actuation field 304, it is possible in an operator-controlled area correspondingly displayed for this purpose to adjust a user profile for the user of the corresponding surgical microscope with corresponding touch-sensitive fields.

The activation of a touch-sensitive actuation field is displayed on the display screen 300 by dark coloration compared to non-activated actuation fields. The dark coloration makes evident to the user the graphic impression of a pressed function key in an area.

With the activation of the actuation field 302, the second operator-controlled area 306 includes: a touch-sensitive field 307 with which photo functions of the surgical microscope can be controlled; a touch-sensitive actuation field 308 with which a video recorder can be operated; a touch-sensitive actuation field 309 with which a video camera can be controlled; and, touch-sensitive actuation fields 310, 311, 312 and 313 are provided for controlling audio and dictation functions, for triggering an autobalancing operation in the surgical microscope system or for controlling a drape-suction arrangement. In the second operator-controlled area 306, there is a graphic display screen window 314 displayed as a video monitor which images an image of a surgical area recorded with a camera mounted in the surgical microscope. By touching an actuation field 315, the dimensions of this graphic display screen window can be magnified. About the graphic display screen window 314 in the second operator-controlled area 306, the following are provided: a touch-sensitive actuation field 316 for selecting a focal length or a microscope main objective system in the surgical microscope; a touch-sensitive actuation field 317 for selecting a magnification factor; a touch-sensitive actuation field 318 for adjusting the intensity of the illuminating light made available by an illuminating device of the surgical microscope; a touch-sensitive actuation field 319 for selecting a focusing speed; a touch-sensitive actuation field 320 for setting a speed with which a magnification factor for the surgical microscope optics can be changed; and, a further touch-sensitive actuation field 321 for controlling the illuminating system of the surgical microscope.

As shown in the case of the touch-sensitive actuation field 320 in FIG. 3, an actuation field 322 having a displaceably configured actuating element 323 is displayed with the activation of one of the actuation fields 319 to 321 via the graphic display screen window 314 and, with the actuation field 322, quasi-continuous changes of a specific surgical microscope size can be undertaken and, in the case shown, this is the adjustment of a speed for the change of a surgical microscope magnification factor.

A portion of each of these touch-sensitive actuation fields has a parabolic periphery whose size is adapted to the fingers of the human hand. Their arrangement is ergonomic and clear so that unwanted erroneous operations can be precluded insofar as possible.

Figure 4:
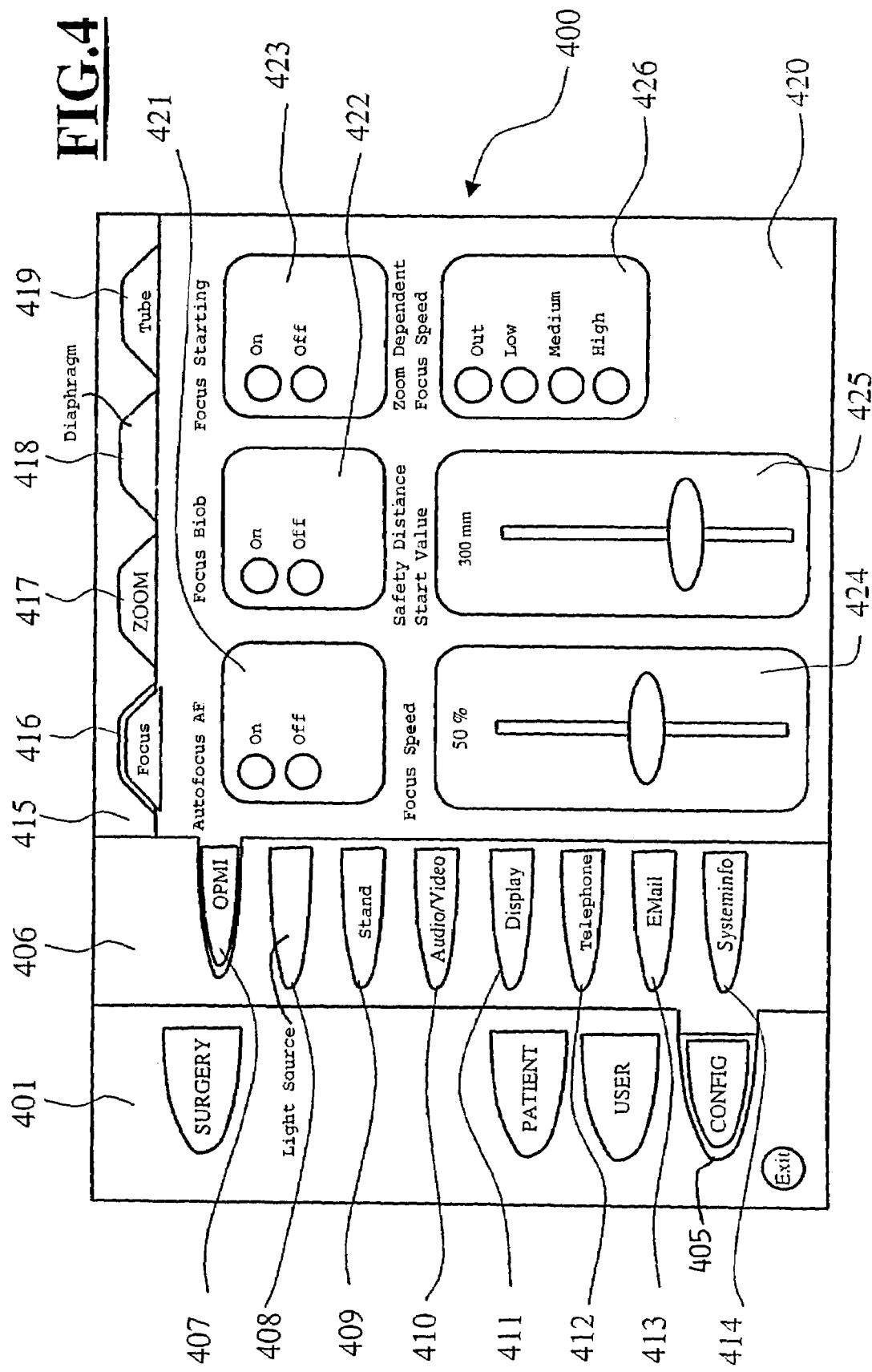

FIG. 4 shows an operating menu 400 which is displayed with a touch-sensitive display screen. On this operating menu 400, the actuation field "apparatus configuration" is activated as a touch-sensitive actuation field 405. The activation of this actuation field makes possible the selection of presettings in the surgical microscope for a later surgery.

The operating menu shows a second operator-controlled area 406 next to a first operator-controlled area 401 wherein a touch-sensitive actuation field 407 is provided for configuring optical units of the surgical microscope and a touch-sensitive actuation field 408 is provided for configuring a light source of the surgical microscope. In addition, a touch-sensitive actuation field 409 is provided in the second operator-controlled area 406 for configuring the surgical microscope stand and a touch-sensitive actuation field 410 is provided for configuring audio and video functions of the surgical microscope. There is a touch-sensitive actuation field 411 for configuring a display in the surgical microscope. The second operator-controlled area 406 includes a touch-sensitive actuation field 412 via which the configuration of a telephone is possible which is integrated in the surgical microscope. In addition, the second operator-controlled field 406 has a touch-sensitive actuation field 413 for configuring e-mail settings in the surgical microscope and there is a touch-sensitive actuation field 414 which, when activated, triggers the display of system data.

In the operating menu 400 shown, the touch-sensitive actuation field 407 is activated in the second operator-controlled area 406 for the configuration of optical units of the surgical microscope.

The activation of this actuation field 407 triggers the display of a third operator-controlled area 415 in the operating menu 400. The third operator-controlled area 415 has the following: a touch-sensitive actuation field 416 for activating a focus adjusting system; a touch-sensitive actuation field 417 for activating a zoom adjusting system; a touch-sensitive actuation field 418 for activating a diaphragm adjusting system; and, a touch-sensitive actuation field 419 which makes possible the activation of a tube adjusting system.

In the operating menu 400, the touch-sensitive actuation field 416 is activated for activating the focus adjusting system.

When activating the actuation field 416, the operating menu 400 shows a fourth operator-controlled area 420 which is configured as a set of index cards and in which actuation fields 421 to 426 are provided which make possible the following: the adjustment of an autofocus; the activation of a focus stop; the control of a focusing assist; the control of a focusing distance; the control of a focusing speed; and, the selection of a protective distance between a surgical microscope main objective system and a patient. When activating the touch-sensitive actuation fields 405, 407 and 416 of the operating menu 400, four operator-controlled areas 401, 406, 415 and 420 are simultaneously displayed with touch-sensitive actuation fields.

Figure 5:
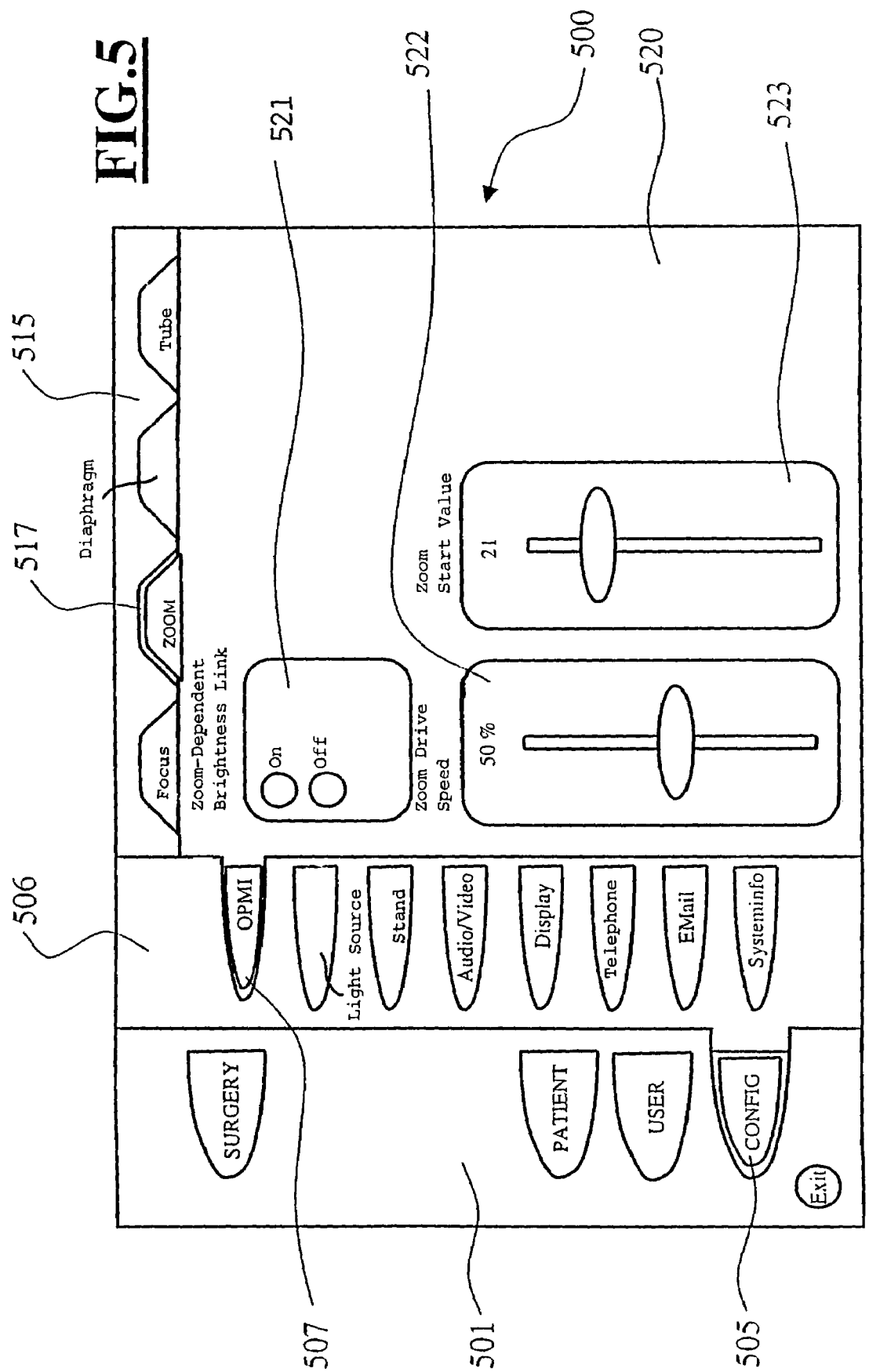

In FIG. 5, an operating menu 500 is shown wherein the touch-sensitive actuation field 505 in a first operating area 501 is activated for controlling the apparatus configuration. The touch-sensitive actuation field 507 for configuring the optical units of the surgical microscope is disposed in the second operator-controlled area 506 and is likewise activated. In contrast to the operating menu shown in FIG. 4, in the operating menu 500, however, the touch-sensitive actuation field 517 for activating a zoom adjusting system is activated in the third operator-controlled area 515. The activation of the zoom adjusting system effects an index card-shaped display of a fourth operator-controlled area 520. In this fourth operator-controlled area, the following are provided: a touch-sensitive actuation field 521 for activating a zoom-dependent brightness adaptation; a touch-sensitive actuation field 522 for activating a zoom drive speed; and, a touch-sensitive actuation field 523 for setting a zoom-start value.

Figure 6:
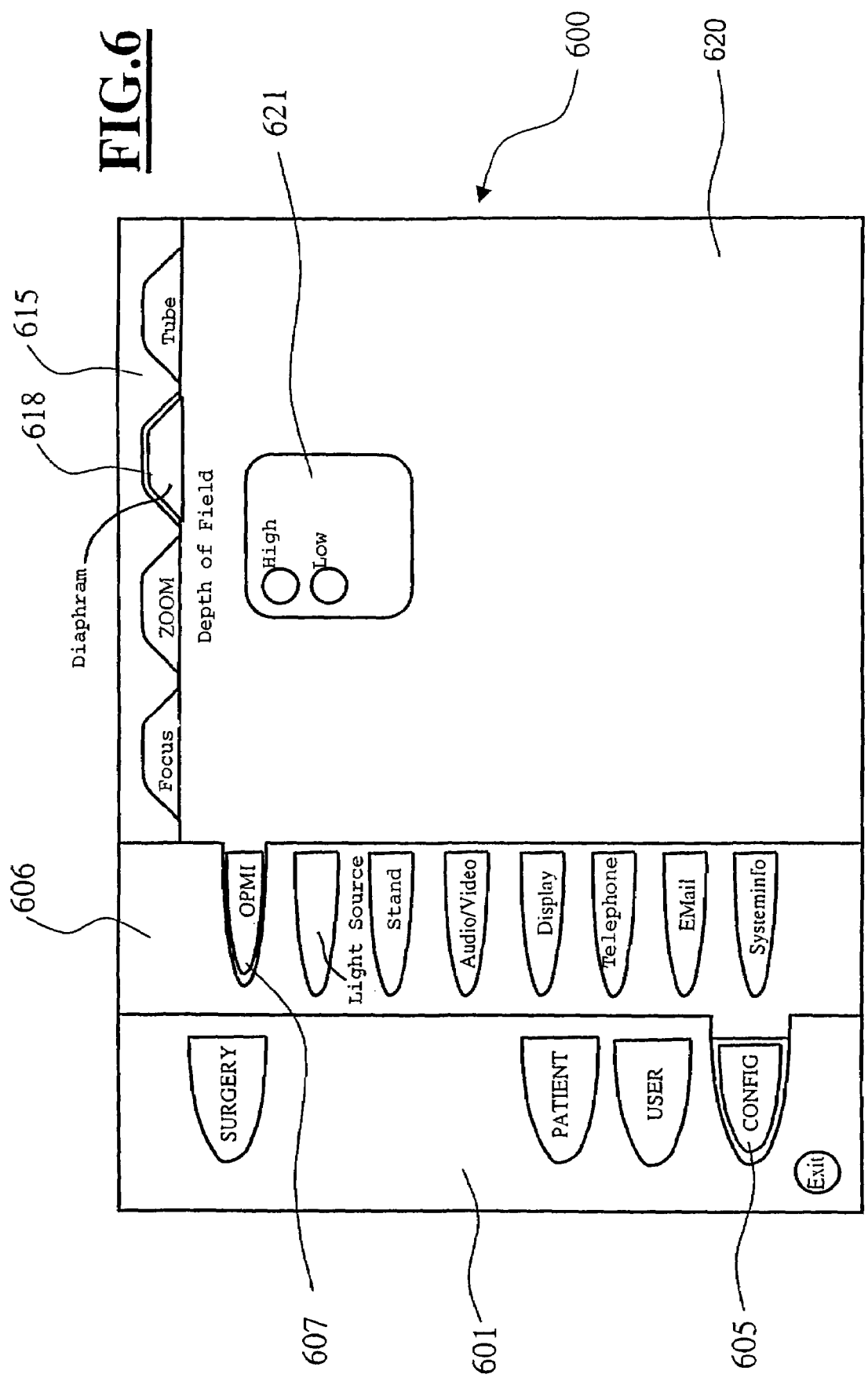

FIG. 6 shows an operating menu 600 wherein the touch-sensitive actuation field 605 for apparatus configuration is again activated in the first operator-controlled area 601 and, in the second operator-controlled area, the touch-sensitive actuation field 607 is activated for the configuration of optical units of the surgical microscope. In the third operator-controlled area 615, the touch-sensitive actuation field 618 for adjusting the diaphragm functions is activated. The activation of this touch-sensitive actuation field has the consequence of providing the display of a fourth operator-controlled area 620 wherein a touch-sensitive actuation field 621 is displayed with which a selection of the depth of field can be undertaken in the surgical microscope.

Figure 7:
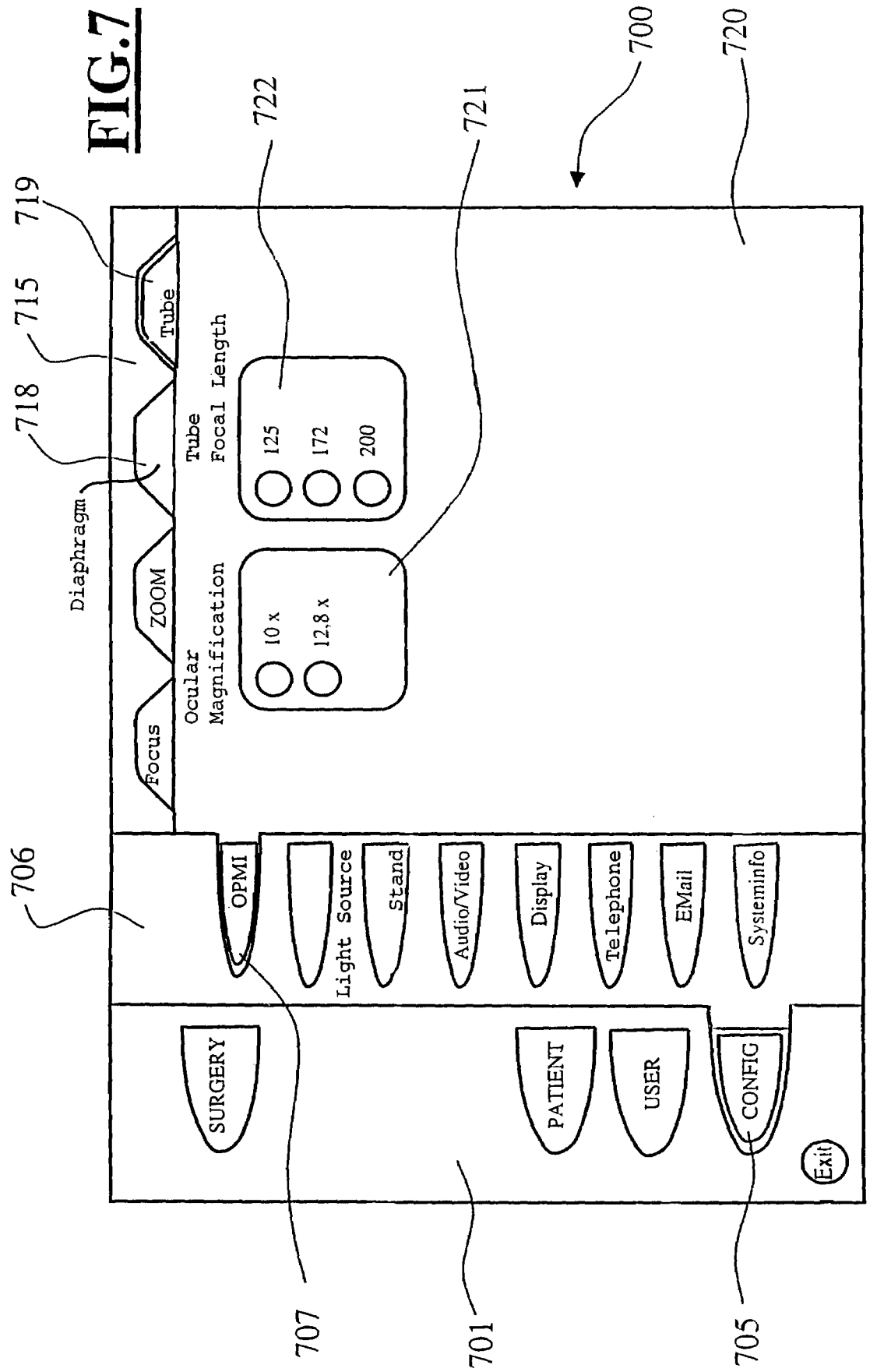

In FIG. 7, an operating menu 700 is shown wherein again, in a first operator-controlled area 701, the touch-sensitive actuation field 705 for apparatus configuration is activated and, in the second operator-controlled area 706, the touch-sensitive actuation field 707 for configuring the optical units of the surgical microscope is activated. In the display of the operator-controlled area 715 effected in this manner, the touch-sensitive actuation field 719 for adjusting the tube in the corresponding surgical microscope is activated in the operating menu 700. The activation of the touch-sensitive actuation field 719 triggers, in turn, an index card-shaped display of a fourth operator-controlled area 720 in which the touch-sensitive actuation field 721 for adjusting an ocular magnification and actuation field 722 for adjusting a tube focal length are provided.

Figure 8:
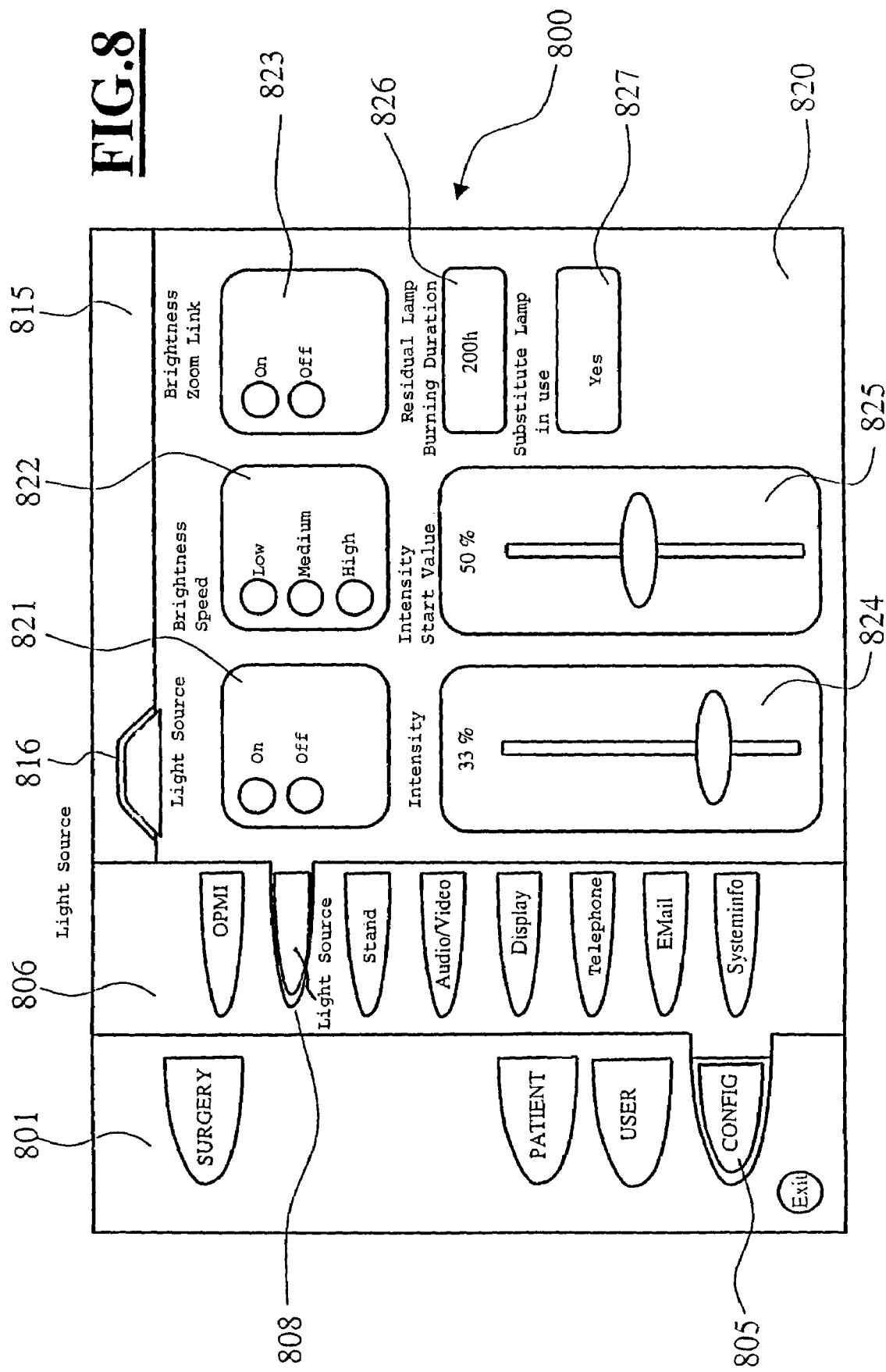

In FIG. 8, an operating menu 800 is shown in whose first operator-controlled area 801, the touch-sensitive actuation field 805 "apparatus configuration" is activated and wherein, in the second operator-controlled area 806, the touch-sensitive actuation field 808 for the configuration of a light source of a surgical microscope is activated. The activation of the touch-sensitive actuation field 808 effects the display of a third operator-controlled area 815 having a touch-sensitive actuation field 816. With an activation, this actuation field 816 triggers an index card-shaped display of a fourth operator-controlled area 820 wherein the following are provided: touch-sensitive actuation field 821 for activating the light source; touch-sensitive actuation field 822 for adjusting a light source speed; touch-sensitive actuation field 823 for selecting a zoom link; touch-sensitive actuation field 824 for selecting a light source intensity; and, touch-sensitive actuation field 825 for selecting a start value for the light source intensity. In addition, in the operator-controlled area 820, a display field 826 for displaying a lamp burning duration is provided and a display as to the use of a substitute lamp is provided as display field 827.

Figure 9:
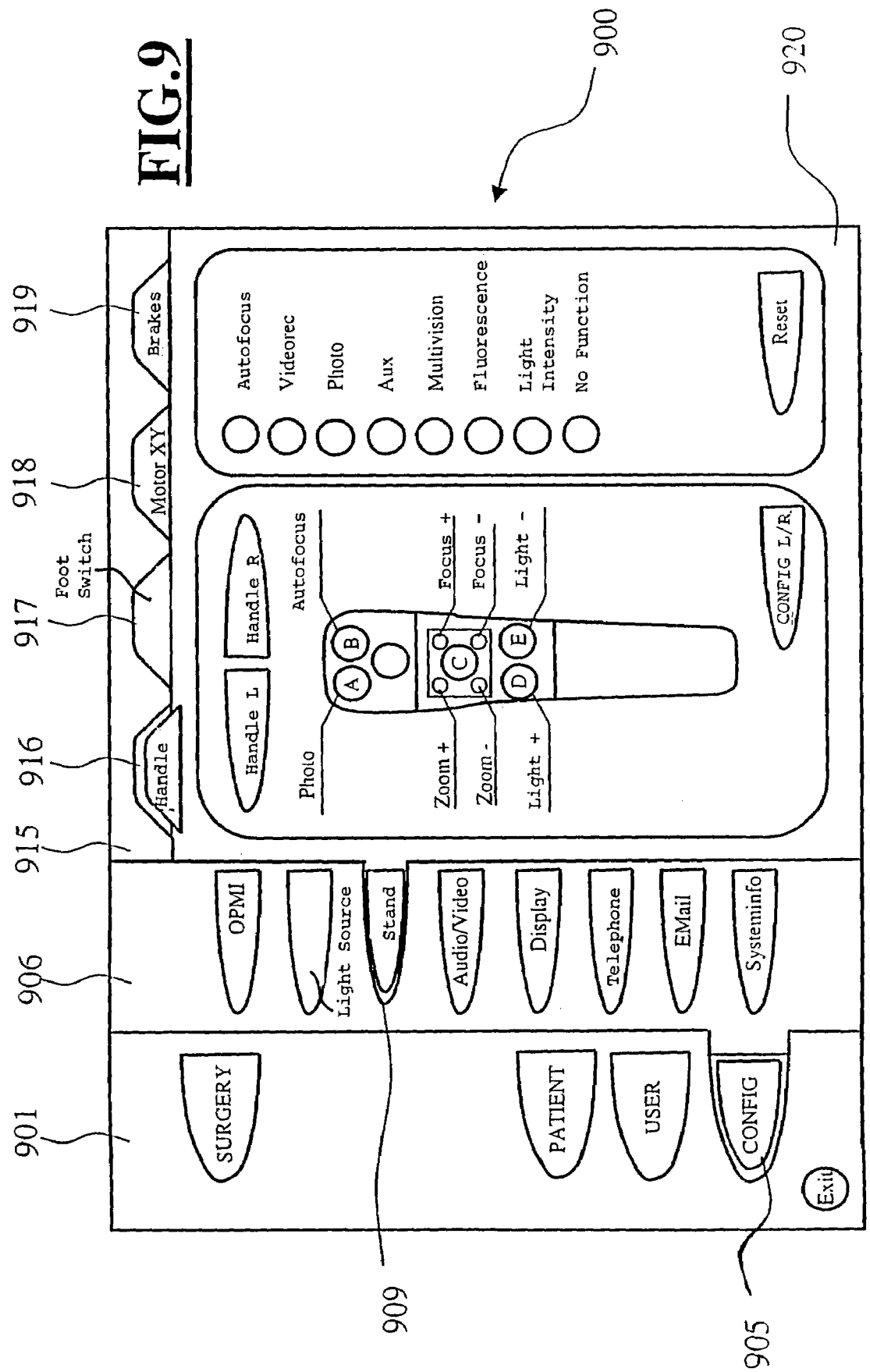

FIG. 9 shows an operating menu 900 wherein, in the first operator-controlled area 901, the touch-sensitive actuation field 905 "apparatus configuration" is activated while, in the second operator-controlled area 906, a touch-sensitive actuation field 909 is activated which makes possible the configuration of the surgical microscope stand. In the illustrated operating menu 900, this actuation field 909 is activated, which effects the display of a third operator-controlled area 915 wherein the following are provided: a touch-sensitive actuation field 916 which makes possible the adjustment of function keys for a handle provided on the surgical microscope; a touch-sensitive actuation field 917 for adjusting the function keys for a foot switch which is provided on the surgical microscope; a touch-sensitive actuation field 918 which makes possible the configuration of an xy-displacement unit in the surgical microscope; and, a touch-sensitive actuation field 919 for driving stand brakes of the surgical microscope.

In the operating menu 900 shown, the touch-sensitive actuation field 916 for adjusting function keys for the handle, which is configured on the surgical microscope, is activated. The activation of this actuation field 916 has the consequence of a display of a fourth operator-controlled area 920 wherein the schematic representation of the handle for the surgical microscope is shown together with the touch-sensitive actuation fields for allocating the function knobs of the handle.

Figure 10:
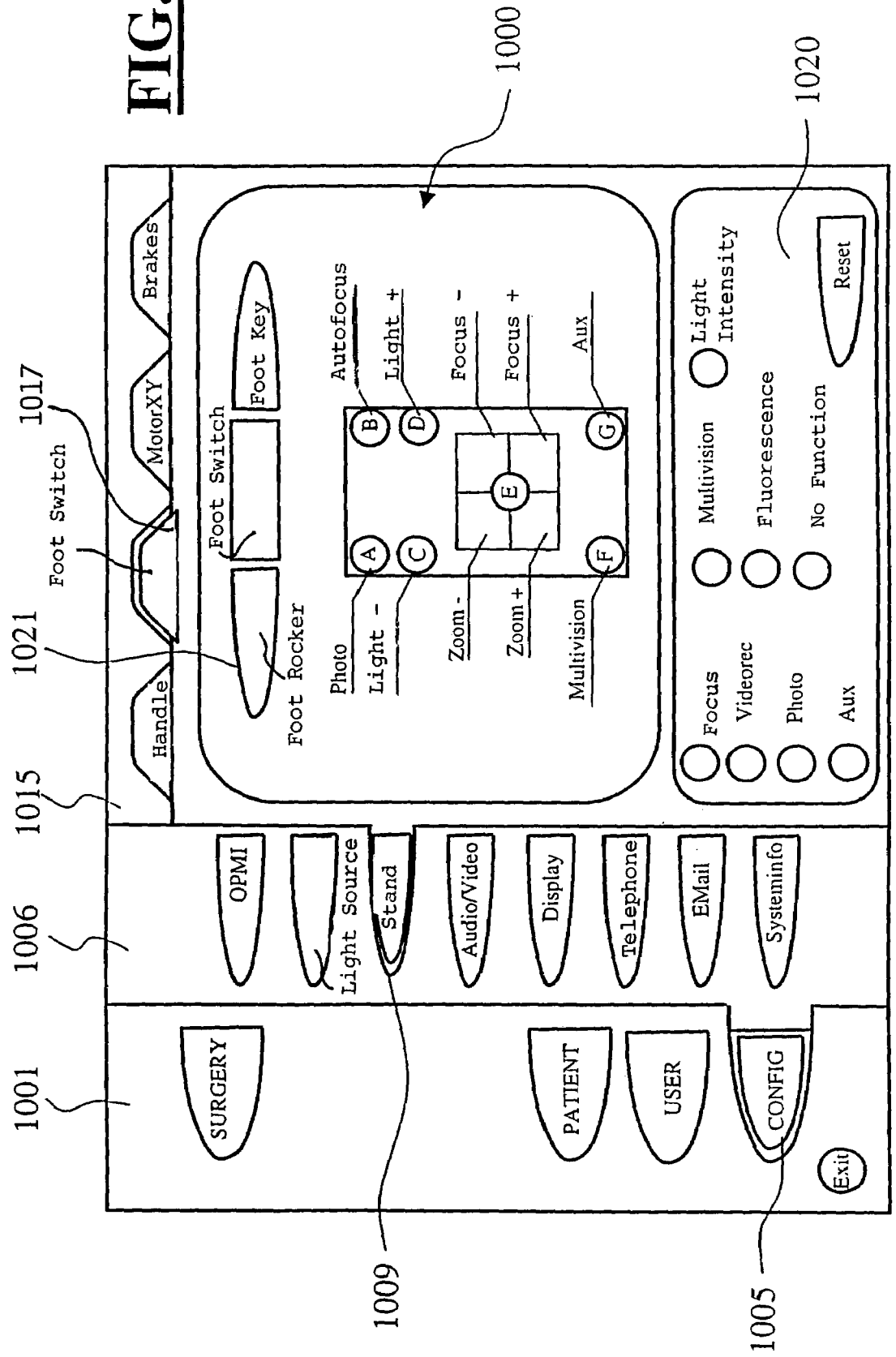

FIG. 10 shows an operating menu 1000 wherein, as for the operating menu 900 of FIG. 9, a touch-sensitive actuation field 1005 for apparatus configuration is activated in a first operator-controlled area 1001 and a touch-sensitive actuation field 1009 for driving stand functions in the surgical microscope is activated in a second operator-controlled area 1006. The activation of the touch-sensitive actuation field 1009 triggers the display of a third operator-controlled area 1015 wherein, in the operating menu 1000 shown in FIG. 10, a touch-sensitive actuation field 1017 for adjusting the assignment of the foot switch functions is activated. The activation of this actuation field 1017 effects the display of a foot switch in a fourth operator-controlled area 1020 together with touch-sensitive actuation fields which make possible an adjustment of the foot switch functions.

Figure 11:
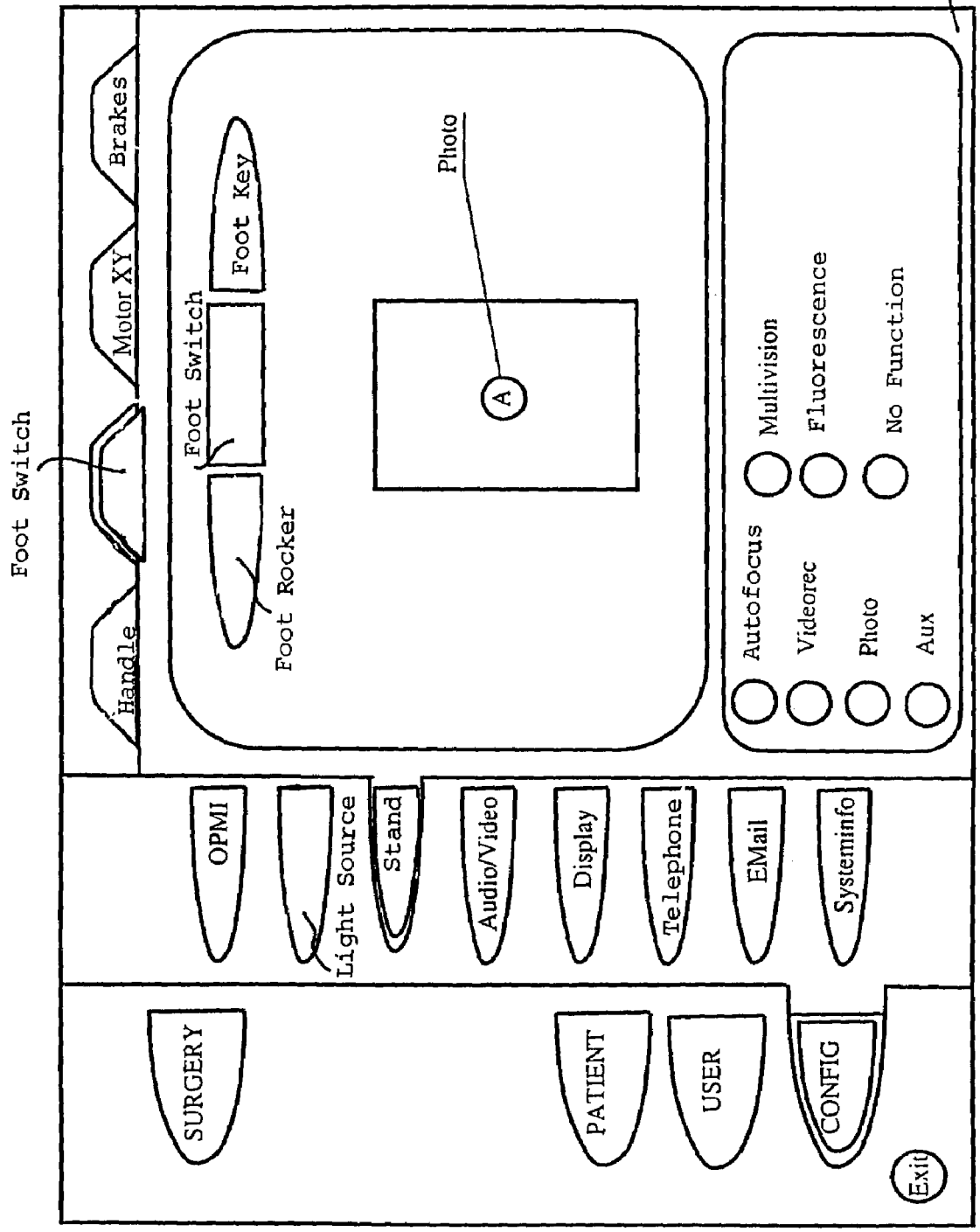

If the touch-sensitive function key 1021 in the operating menu 1000 is activated, then there results the operating menu shown in FIG. 11 wherein, in a fourth operator-controlled area 1120, a foot key is shown whose function key assignment can be adjusted via corresponding touch-sensitive actuation fields in the operator-controlled area 1120.

Figure 12:
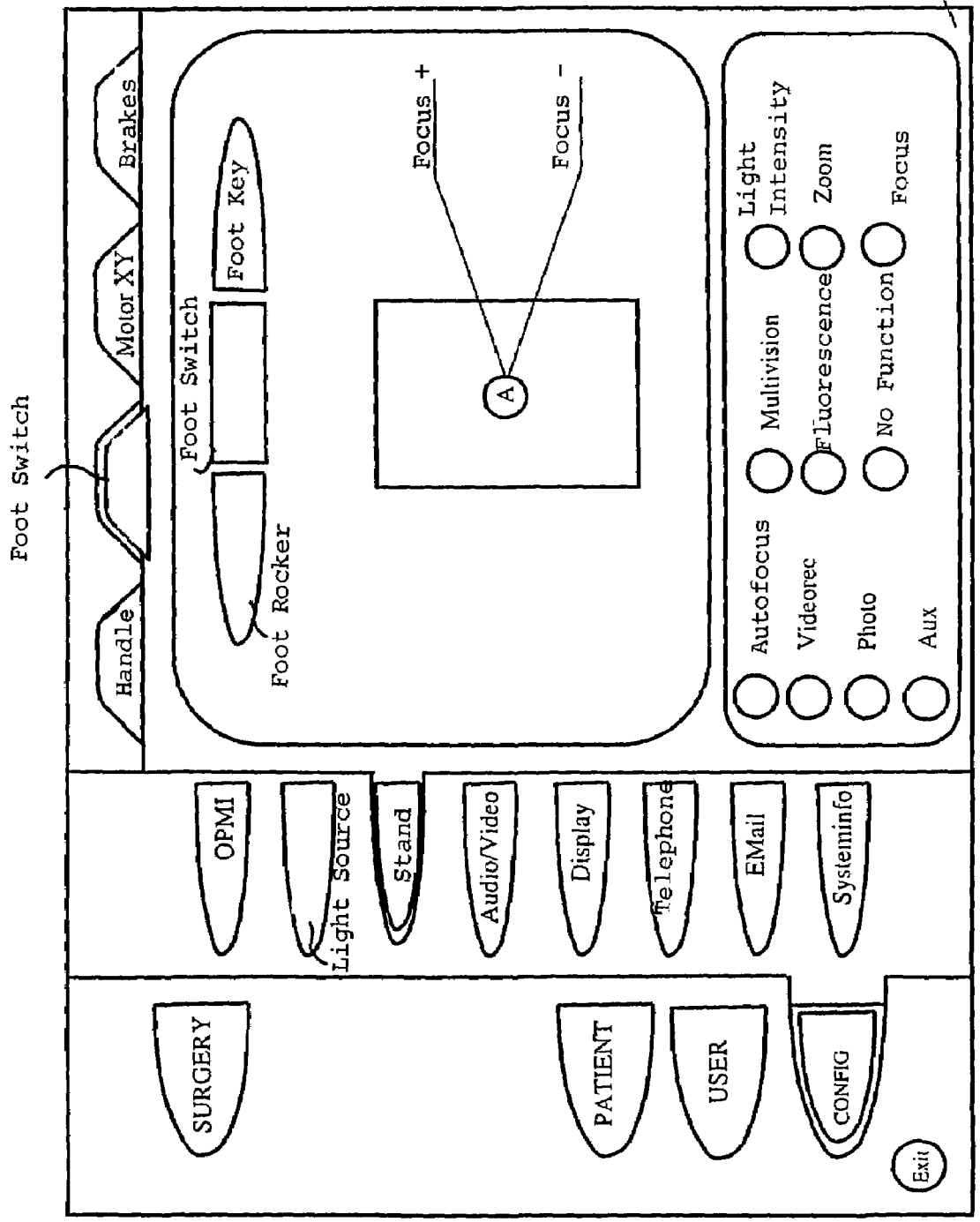

In a corresponding manner, the activation of a touch-sensitive function key 1021 in the operating menu 1000 of FIG. 10 leads to the display of a fourth operator-controlled area 1220 in an operating menu shown in FIG. 12 wherein a foot rocker is shown whose functions can be occupied in this fourth operator-controlled area by assigned touch-sensitive actuation fields.

Figure 13:
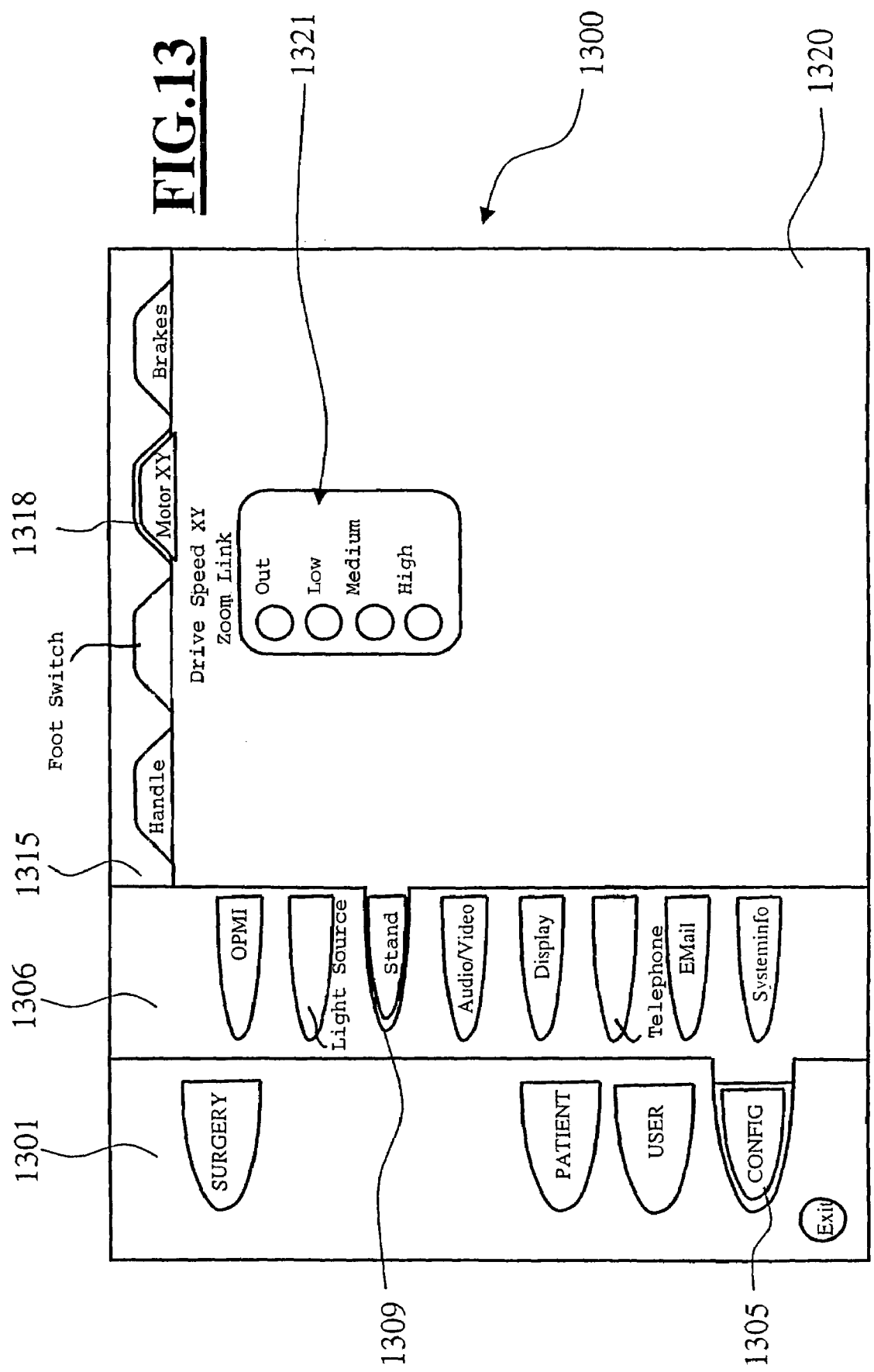

FIG. 13 shows an operating menu 1300, which in a first operator-controlled area 1301, has a touch-sensitive actuation field 1305 for undertaking apparatus configurations of the surgical microscope. This actuation field 1305 is activated, which, in a second operator-controlled area 1306, triggers the display of a touch-sensitive actuation field 1309 which is likewise activated so that a touch-sensitive actuation field 1318 is displayed in a third operator-controlled area 1315. The actuation field 1318 makes possible the adjustment of the xy-displacement arrangement of the surgical microscope.

In the operating menu 1300 shown in FIG. 13, the touch-sensitive actuation field 1318 is activated which has the consequence of displaying a fourth operator-controlled area 1320 wherein touch-sensitive actuation fields 1321 are disposed via which the corresponding xy-displacement device can be adjusted in the surgical microscope.

Figure 14:
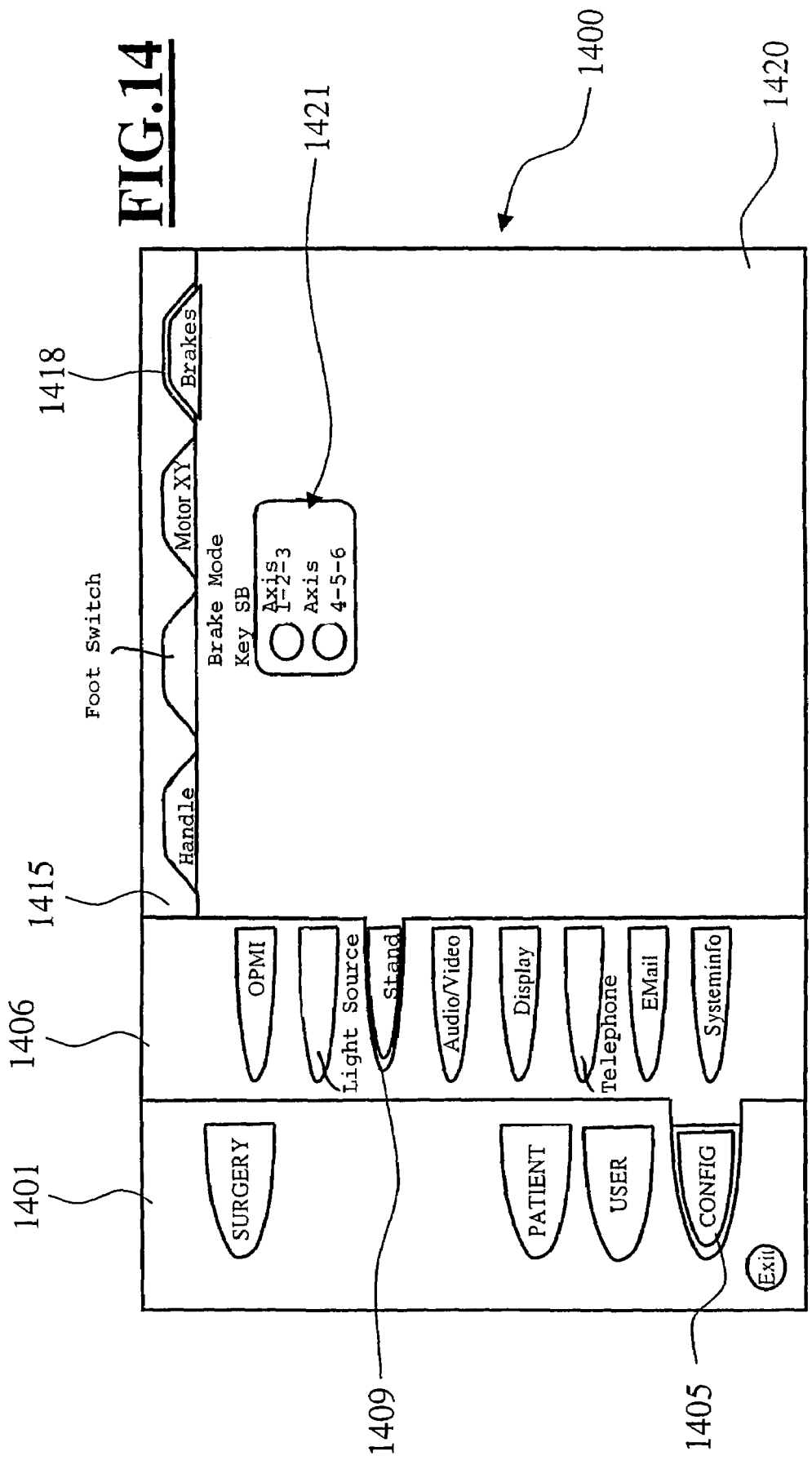

In FIG. 14, an operating menu 1400 is shown wherein, in a first operator-controlled area 1401, a touch-sensitive actuation field 1405 is activated for undertaking apparatus configurations of the surgical microscope and, in a second operator-controlled area 1406, a touch-sensitive actuation field 1409 was actuated in order to adjust stand functions in the surgical microscope. The activation of the touch-sensitive actuation field 1409 causes the display of a third operator-controlled area 1415 wherein a touch-sensitive actuation field 1418 is displayed which is likewise disposed in the activated state. The activation of the actuation field 1418, in turn, effects the index card-shaped display of a fourth operator-controlled area 1420 wherein touch-sensitive actuation fields 1421 are provided which make possible the control of the stand brakes in the surgical microscope.

Figure 15:
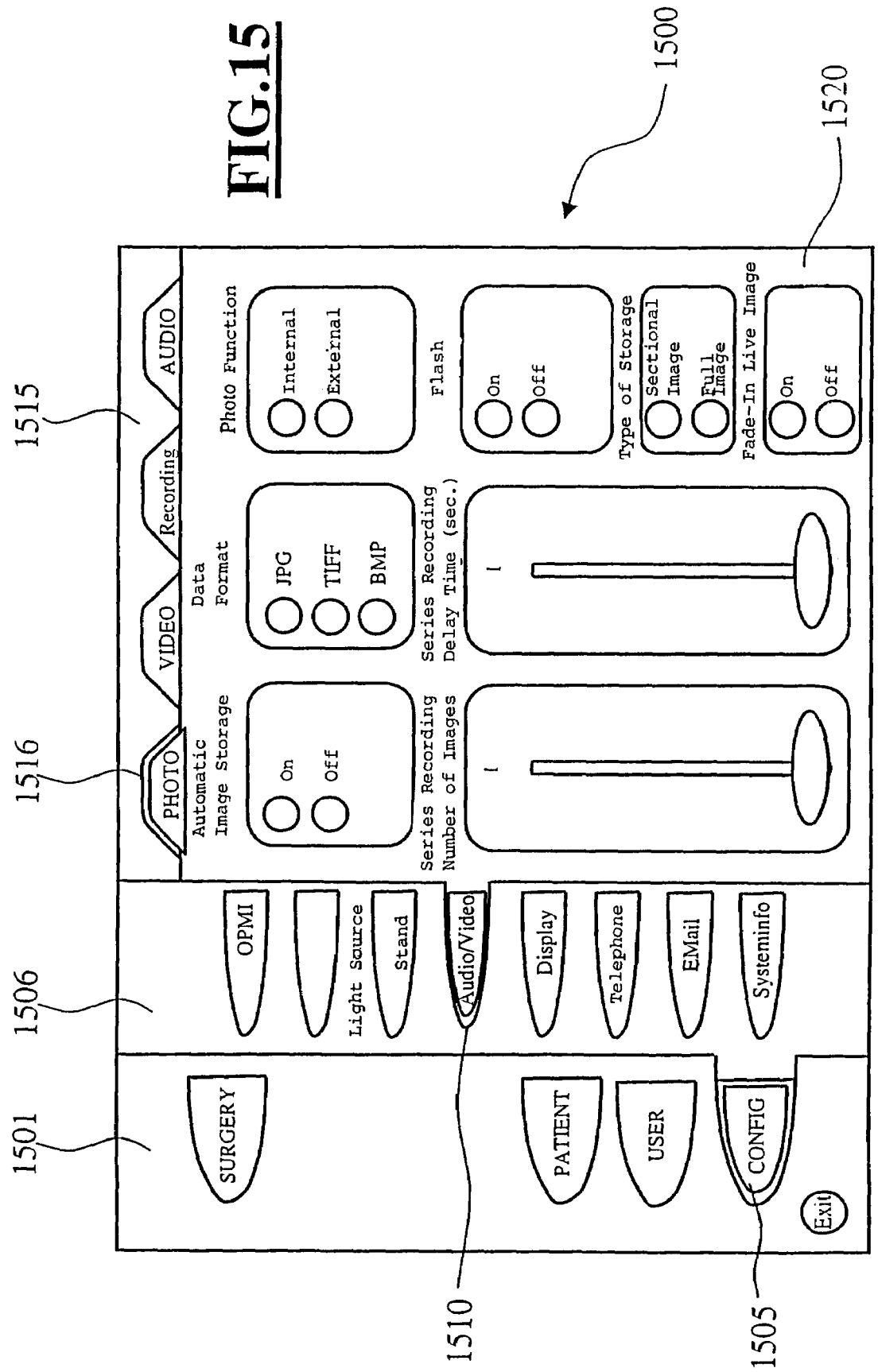

In FIG. 15, an operating menu 1500 is shown wherein, in a first operator-controlled area 1501, a touch-sensitive actuation field 1505 is activated for adjusting apparatus configurations in the surgical microscope and, in a second operator-controlled area 1506, a touch-sensitive actuation field 1510 is activated which makes possible the adjustment of audio and video functions in the surgical microscope. The activation of the touch-sensitive actuation field 1510 effects the display of a third operator-controlled area 1515 wherein a touch-sensitive actuation field 1516 is disposed which is shown in the activated state for the operating menu 1500. The activation of the actuation field 1516 has the consequence that the display of a fourth operator-controlled area 1520 occurs wherein touch-sensitive actuation fields are disposed which make possible an adjustment of photo functions in the surgical microscope.

Figure 16:
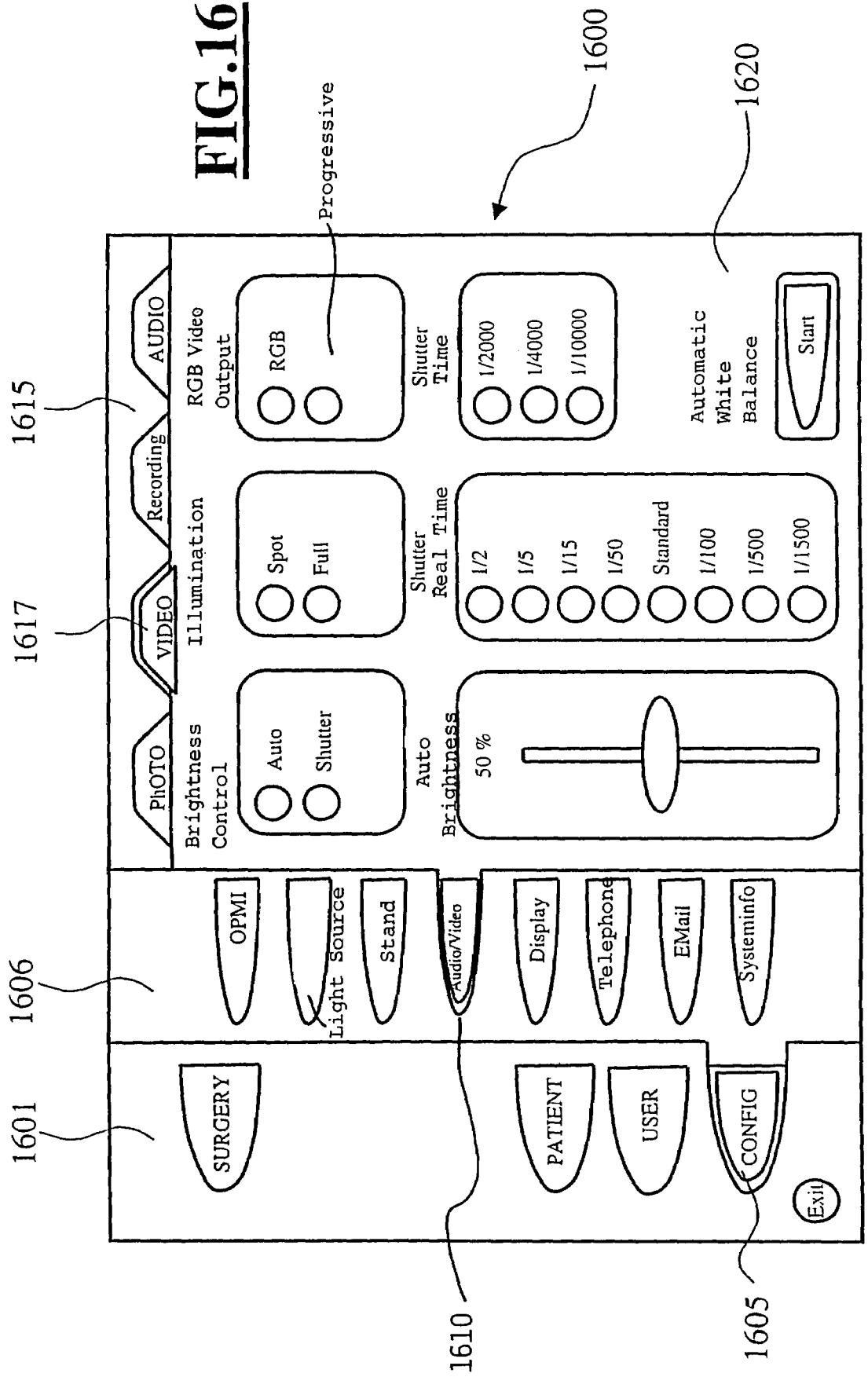

In FIG. 16, a corresponding operating menu is shown wherein, in turn, a touch-sensitive actuation field 1605 is activated in a first operator-controlled area 1601 and a touch-sensitive actuation field 1610 is activated in a second operator-controlled area 1606 in order to trigger the display of a touch-sensitive actuation field 1617 in a third operator-controlled area 1615. The touch-sensitive actuation field 1617 makes possible the configuration of a video system in the surgical microscope. In the operating menu 1600, the touch-sensitive actuation field 1617 is shown in the activated state, which triggers the display of a fourth operator-controlled area 1620, wherein touch-sensitive actuation fields are located in which video functions can be configured for a video system integrated into the surgical microscope.

Figure 17:
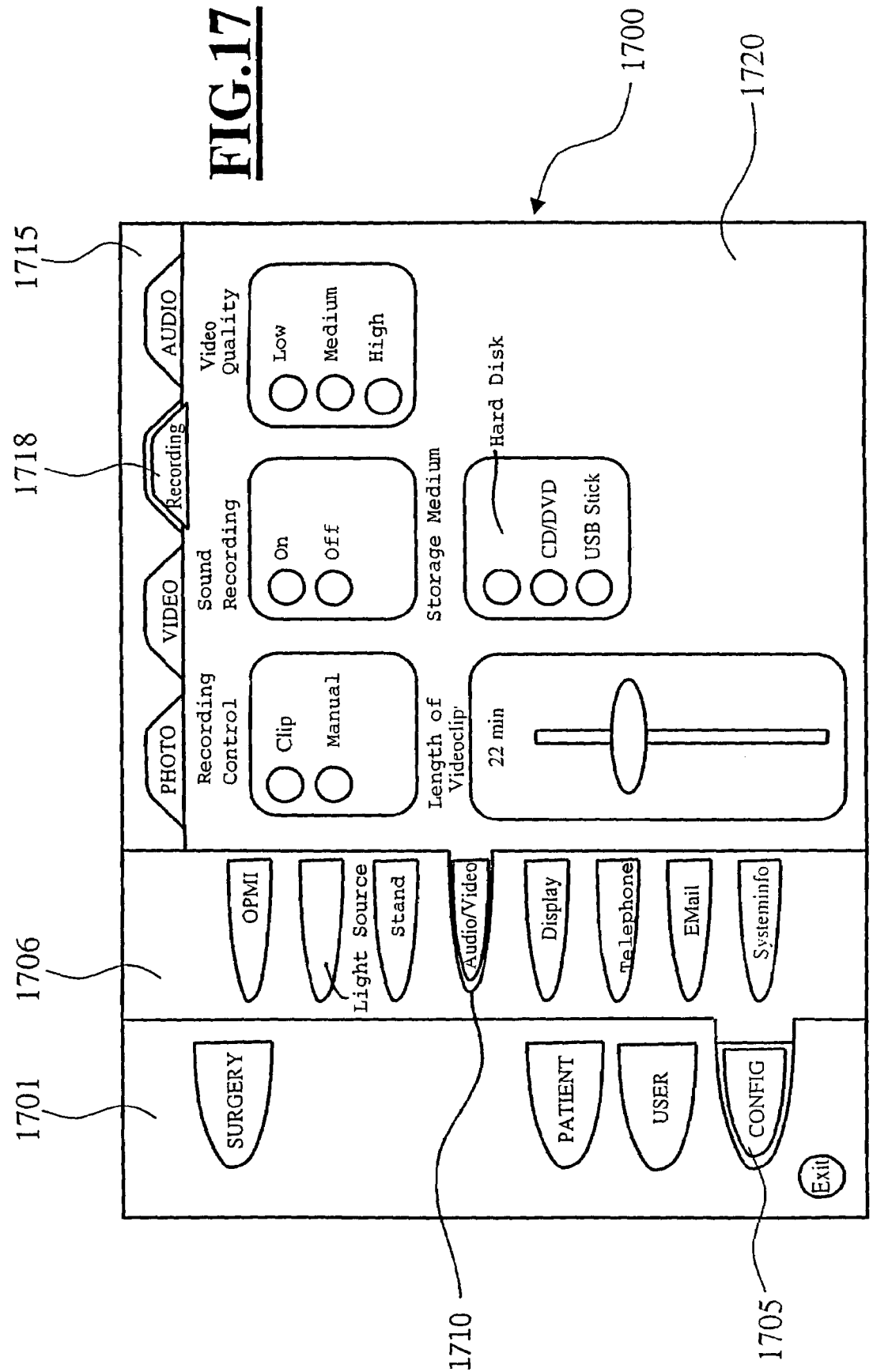

FIG. 17 shows a corresponding operating menu 1700 with a touch-sensitive actuation field 1705 in a first operator-controlled area 1701 and a touch-sensitive actuation field 1710 which is activated in a second operator-controlled area 1706 in order to, in turn, make possible the adjustment of audio and video functions in the surgical microscope. In a third operator-controlled area 1715, a touch-sensitive actuation field 1718 is displayed which, in the operating menu 1700 of FIG. 17, is shown in the activated state. The activation of the touch-sensitive actuation field 1718 leads, in turn, to the display of a fourth operator-controlled area 1720 wherein touch-sensitive actuation fields are provided for adjusting recording functions of a video system integrated into the surgical microscope.

Figure 18:
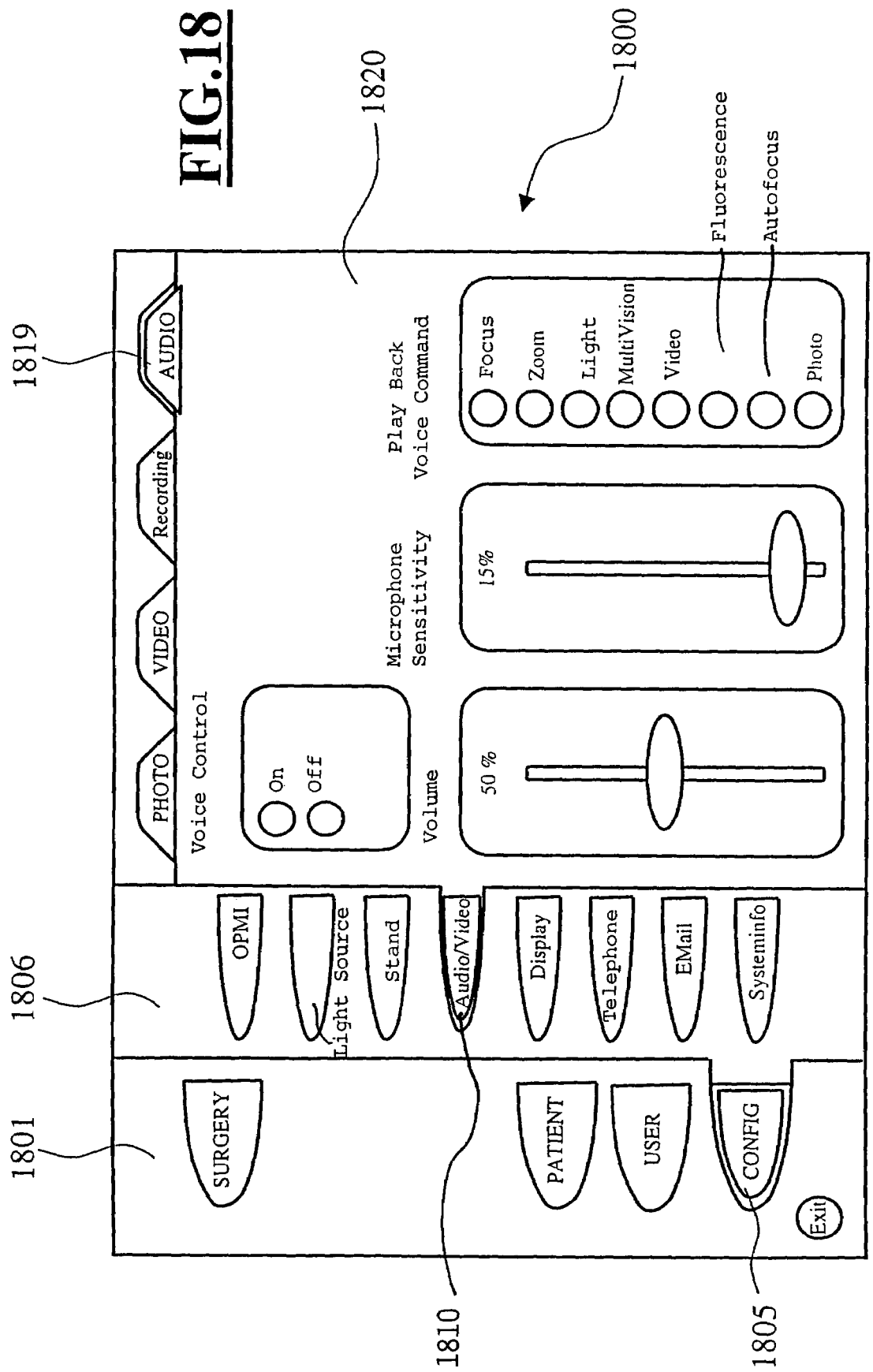

FIG. 18 shows an operating menu 1800 with an activated touch-sensitive actuation field 1805 in a first operator-controlled area 1801 and a touch-sensitive actuation field 1810 in a second operator-controlled area 1806 which, in turn, is for adjusting audio and video functions in the surgical microscope. In an illustrated third operator-controlled area 1815, a touch-sensitive actuation field 1819 is shown in the activated state which makes possible an adjustment of audio functions in the surgical microscope. The activation of the touch-sensitive actuation field 1819 triggers the display of a fourth operator-controlled area 1820 wherein touch-sensitive actuation fields for the following are provided: the configuration of an automatic voice input; the adjustment of a microphone; and, additional voice control functions.

Figure 19:
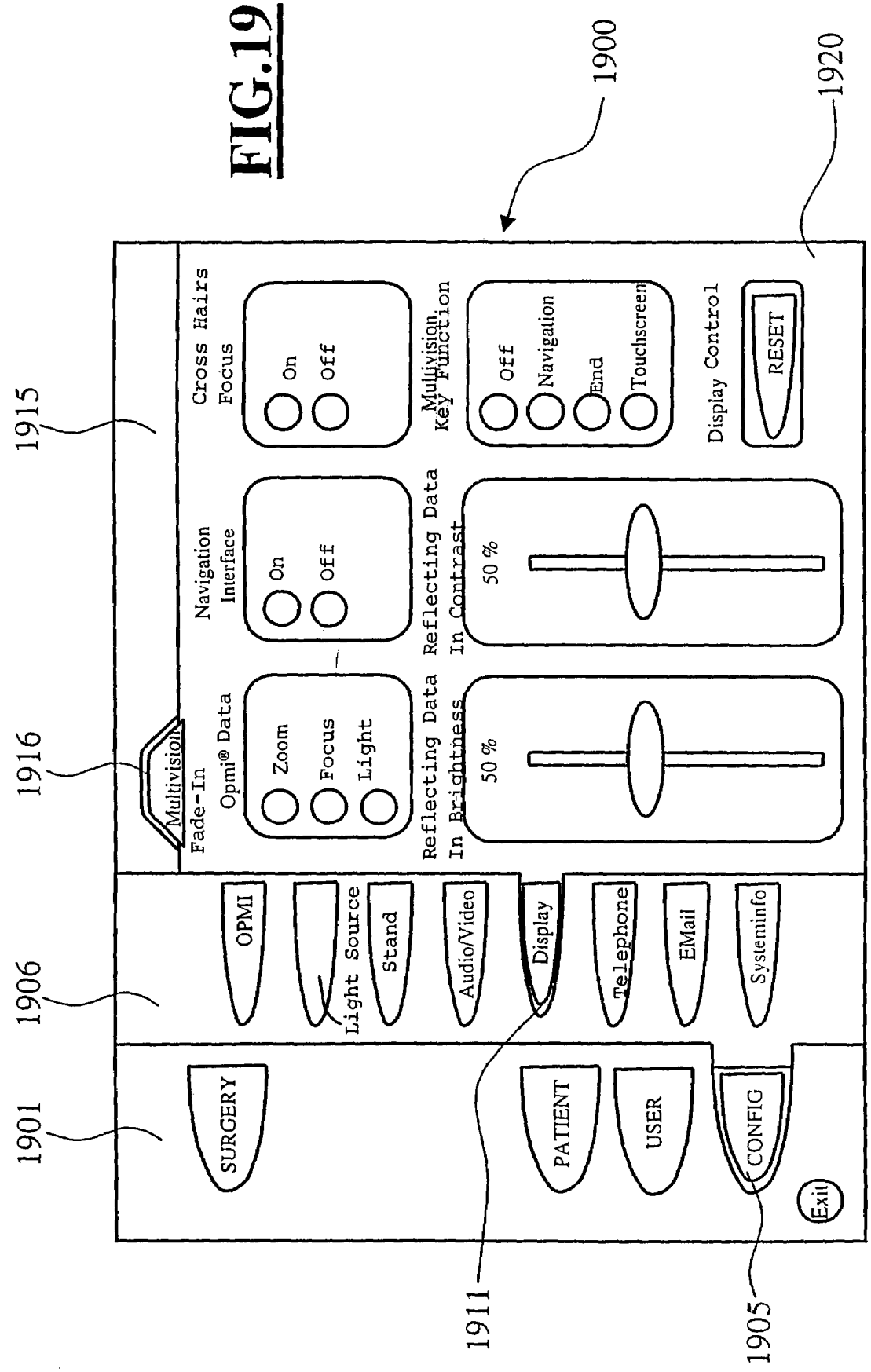

In FIG. 19, an operating menu 1900 is shown wherein, in a first operator-controlled area 1901, a touch-sensitive actuation field 1905 for apparatus configurations is activated in order to effect the display of a touch-sensitive actuation field 1911 in a second operator-controlled area 1906. The actuation field 1911 makes possible the modification of display settings in the touch-sensitive display screen which is provided on the surgical microscope. The activation of the touch-sensitive actuation field 1911 triggers the display of a touch-sensitive actuation field 1916 in a third operator-controlled area 1915. The actuation field 1916 is shown in the activated state for the operating menu 1900. In the activated state, the touch-sensitive actuation field 1916 effects the display of a fourth operator-controlled area 1920 wherein touch-sensitive actuation fields are provided in order to be able to undertake an adjustment of the display functions of the touch-sensitive display screen.

In FIG. 20, an operating menu 2000 is shown wherein, in a first operator-controlled area 2001, a touch-sensitive actuation field 2005 is activated which effects the display of a touch-sensitive field 2014 in a second operator-controlled area 2006. The actuation field 2014 makes possible the display of system information when activated. The activation of the touch-sensitive actuation field 2014 triggers the display of a touch-sensitive actuation field 2016 in a third operator-controlled area 2015 which, when activated, causes an index card-shaped display of a fourth operator-controlled area 2020 wherein system data for the surgical microscope system are displayed.

It is understood that the foregoing description is that of the preferred embodiments of the invention and that various changes and modifications may be made thereto without departing from the spirit and scope of the invention as defined in the appended claims.

What is claimed is:

1. A compact surgical microscope system comprising:
a console;
a stand unit mounted on said console and including a carrier arm;
a surgical microscope mounted on said carrier arm;
a single, self-contained, operator-controlled touch-sensitive display screen for displaying an operating menu for all control functions of said surgical microscope;
said display screen being mounted on said console;
said console and said display screen conjointly defining a front surface for facing toward the operator and said front surface being completely devoid of control elements except for said display screen;
a control computer mounted on said console and interconnecting said touch-sensitive display screen and said surgical microscope;
said operating menu including first and second operator-controlled areas displayed simultaneously on said display screen;
said first operator-controlled area having a first plurality of touch-sensitive actuation fields for selecting an operating mode of said surgical microscope;
said first operator-controlled area of said operating menu including:
a touch-sensitive actuation field having the function "surgical procedure" as an operating mode of said surgical microscope;
a touch-sensitive actuation field having the function "patient data input" as an operating mode of said surgical microscope;
a touch-sensitive actuation field having the function "user data input"; and,
a touch-sensitive actuation field having the function "apparatus configuration";
said second operator-controlled area displaying a second plurality of touch-sensitive fields in dependence upon the mode of operation selected from said first plurality of touch-sensitive fields; and,
said second plurality of touch-sensitive fields being provided for carrying out the selected mode of operation of said surgical microscope and being displayed simultaneously with said first plurality of touch-sensitive fields.

2. The surgical microscope system of claim 1, wherein, with activation of the actuation field having the function "surgical procedure", the second operator-controlled area displays a touch-sensitive actuation field which, when activated, makes possible an image recordation with a photo or video camera of the surgical microscope.

3. The surgical microscope system of claim 1, wherein, with activation of the actuation field with the function "surgical procedure", the second operator-controlled area displays a touch-sensitive actuation field which, when activated, makes possible the control of a video recorder of said surgical microscope.

4. The surgical microscope system of claim 3, wherein, with activation of the actuation field, which makes possible the control of a video recorder of said surgical microscope, the operating menu has a third operator-controlled area wherein touch-sensitive actuation fields are provided for adjusting video recorder control functions.

5. The surgical microscope system of claim 1, wherein, with activation of the actuation field having the function "surgical procedure", the second operator-controlled area displays a touch-sensitive actuation field which makes possible the control of a video camera of said surgical microscope.

6. The surgical microscope system of claim 1, wherein, with activation of the actuation field having the function "surgical procedure", the second operator-controlled area displays a touch-sensitive actuation field which makes possible the control of audio functions of said surgical microscope.

7. The surgical microscope system of claim 1, wherein, with activation of the actuation field having the function "surgical procedure", the second operator-controlled area displays a touch-sensitive actuation field which makes possible the control of dictating functions in the surgical microscope.

8. The surgical microscope system of claim 1, wherein, with activation of the actuation field with the function "surgical procedure", the second operator-controlled area displays a touch-sensitive actuation field which makes possible the control of a self-balancing for a stand of said surgical microscope.

9. The surgical microscope system of claim 1, wherein, with activation of the actuation field having the function "surgical procedure", the second operator-controlled area displays a touch-sensitive actuation field which makes possible the control of a drape suction in said surgical microscope.

10. The surgical microscope system of claim 1, wherein, with activation of the actuation field with the function "surgical procedure", a video monitor is configured in the second operator-controlled area with this video monitor displaying an image of a surgical area recorded by a video camera.

11. The surgical microscope system of claim 10, wherein said second operator-controlled area displays a touch-sensitive actuation field which effects a magnification of the video monitor when activated.

12. The surgical microscope system of claim 1, wherein, with activation of. the actuation field having the function "patient data input", the second operator-controlled area displays one or several touch-sensitive actuation fields for at least one of patient data input and patient data.

13. The surgical microscope system of claim 1, wherein, with activation of the actuation field having the function "patient data input", a touch-sensitive actuation field for a password input is displayed.

14. The surgical microscope system of claim 1, wherein, with activation of the actuation field having the function "apparatus configuration", the second operator-controlled area displays at least one of:
a touch-sensitive actuation field which makes possible the configuration of optical units of said surgical microscope;
a touch-sensitive actuation field which makes possible the configuration of a light source of said surgical microscope;
a touch-sensitive actuation field which makes possible the configuration of a surgical microscope stand;
a touch-sensitive actuation field which makes possible the configuration of audio and video functions of said surgical microscope;
a touch-sensitive actuation field which makes possible the configuration of the touch-sensitive display screen of the surgical microscope;
a touch-sensitive actuation field which makes possible the configuration of a telephone which is integrated in the surgical microscope;
a touch-sensitive actuation field which makes possible the configuration of e-mail adjustments of the surgical microscope; and, a touch-sensitive actuation field which makes possible the display of system data.

15. The surgical microscope system of claim 14, wherein, with activation of the actuation field for the configuration of optical units of said surgical microscope, the operating menu displays a third operator-controlled area wherein at least one of the following is provided:
a touch-sensitive actuation field for activating a focus adjusting system;
a touch-sensitive actuation field for activating a zoom adjustment system;
a touch-sensitive actuation field for activating a diaphragm adjusting system; and,
a touch-sensitive actuation field for activating a tube adjusting system.

16. The surgical microscope system of claim 15, wherein, with activation of the actuation field for activating a focus adjusting system, the operating menu displays a fourth operator-controlled area wherein at least one of the following is provided:
a touch-sensitive actuation field for controlling an autofocus;
a touch-sensitive actuation field for controlling a focus stop;
a touch-sensitive actuation field for controlling a focus assist;
a touch-sensitive actuation field for controlling a safety distance monitoring; and,
a touch-sensitive actuation field for controlling a zoom-dependent focus speed.

17. The surgical microscope system of claim 15, wherein, when activating the actuation field for activating a zoom adjusting system, the operating menu displays a fourth operator-controlled area wherein at least one of the following is provided:
a touch-sensitive actuation field for activating a zoom-dependent brightness adaptation;
a touch-sensitive actuation field for adjusting a zoom drive speed; and,
a touch-sensitive actuation field for adjusting a zoom start value.

18. The surgical microscope system of claim 15, wherein, with activation of the actuation field for activating a diaphragm adjusting system, the operating menu displays a fourth operator-controlled area wherein at least one of the following is provided: a touch-sensitive actuation field for diaphragm adjustment and a touch-sensitive actuation field for controlling a fluorescence filter.

19. The surgical microscope system of claim 15, wherein, when activating the actuation field for activating a tube adjustment system, the operating menu displays a fourth operator-controlled area wherein at least one of the following is provided:
a touch-sensitive actuation field for adjusting a pupil distance;
a touch-sensitive actuation field for adjusting an ocular ametropic correction;
a touch-sensitive actuation field for adjusting an ocular magnification; and,
a touch-sensitive actuation field for adjusting a tube focal length.

20. The surgical microscope system of claim 14, wherein, with activation of the actuation field which makes possible the configuration of a light source of the surgical microscope, the operating menu displays an operator-controlled area wherein at least one of the following is provided:
a touch-sensitive actuation field for activating a light source;
a touch-sensitive actuation field for adjusting a light source speed; and,
a touch-sensitive actuation field for adjusting a zoom link for the light source.

21. The surgical microscope system of claim 20, wherein at least one of the following is provided:
a display field in the operator-controlled area which displays a lamp burning duration; and,
a display field which displays the use of a substitute lamp.

22. The surgical microscope system of claim 14, wherein, with activation of the actuation field which makes possible the configuration of the surgical microscope stand, the operating menu displays a third operator-controlled area wherein a touch-sensitive actuation field is provided for adjusting an allocation for function keys for a handle configured on the surgical microscope.

23. The surgical microscope system of claim 22, wherein, with activation of the touch-sensitive actuation field for adjusting the allocation for function keys for a handle configured on the surgical microscope, the operating menu displays a fourth operator-controlled area wherein one or several touch-sensitive fields are provided for the configuration of the handle.

24. The surgical microscope system of claim 14, wherein, with activation of the actuation field which makes possible the configuration of a surgical microscope stand, the operating menu displays a third operator-controlled area wherein a touch-sensitive actuation field is provided for activating a foot switch adjusting field.

25. The surgical microscope system of claim 24, wherein, when activating the foot switch actuation field, the operating menu displays a fourth operator-controlled area wherein one or several touch-sensitive fields are provided for configuring a foot switch.

26. The surgical microscope system of claim 14, wherein, when activating the actuation field which makes possible the configuration of the surgical microscope stand, the operating menu displays a third operator-controlled area wherein a touch-sensitive actuation field is provided for activating an actuation field for the adjustment of an xy-displacement device.

27. The surgical microscope system of claim 26, wherein, when activating the actuation field for adjusting an xy-displacement device, the operating menu displays a fourth operator-controlled area wherein touch-sensitive fields are provided for configuring an xy-displacement device.

28. The surgical microscope system of claim 14, wherein, when activating the actuation field which makes possible the configuration of a surgical microscope stand, the operating menu displays a third operator-controlled area wherein a touch-sensitive actuation field is provided for activating an actuation field for the adjustment of stand brakes of the surgical microscope.

29. The surgical microscope system of claim 28, wherein, when activating the actuation field for adjusting the stand brakes of the surgical microscope, the operating menu displays a fourth operator-controlled area wherein touch-sensitive fields are provided for configuring the stand brakes.

30. The surgical microscope system of claim 1, wherein, when activating the actuation field with the function "user data input", the second operator-controlled area displays a touch-sensitive actuation field for at least one of language selection and user profile change.

31. A compact surgical microscope system comprising:
a console;

a stand unit mounted on said console and including a carrier arm;

a surgical microscope;

a single, self-contained, operator-controlled touch-sensitive display screen for displaying an operating menu for all control functions of said surgical microscope;

said display screen being mounted on said console;

said console and said display screen conjointly defining a front surface for facing toward the operator and said front surface being completely devoid of control elements except for said display screen;

a control computer mounted on said console and interconnecting said touch-sensitive display screen and said surgical microscope;

said operating menu including first and second operator-controlled areas displayed simultaneously on said display screen;

said first operator-controlled area having a first plurality of touch-sensitive actuation fields for selecting an operating mode of said surgical microscope;

said first operator-controlled area of said operating menu including at least one of the following:

a touch-sensitive actuation field having the function "surgical procedure" as an operating mode of said surgical microscope;

a touch-sensitive actuation field having the function "patient data input" as an operating mode of said surgical microscope;

a touch-sensitive actuation field having the function "user data input"; and, a touch-sensitive actuation field having the function "apparatus configuration";

said second operator-controlled area displaying a second plurality of touch-sensitive fields in dependence upon the mode of operation selected from said first plurality of touch-sensitive fields;

said second plurality of touch-sensitive fields being provided for carrying out the selected mode of operation of said surgical microscope and being displayed simultaneously with said first plurality of touch-sensitive fields; and, at least a portion of said touch-sensitive fields having a parabolic periphery adapted to the fingers of the human hand to preclude unwanted erroneous operations.

32. The surgical microscope system of claim 31, wherein said touch-sensitive fields having said parabolic periphery are ergonomically arranged on said display screen so as to cause the apex of each of said touch-sensitive fields to be directed outwardly toward an edge of said display screen.

33. The surgical microscope system of claim 1, wherein at least a portion of said touch-sensitive fields have a parabolic periphery adapted to the fingers of the human hand to preclude unwanted erroneous operations; and, said touch-sensitive fields having said parabolic periphery are ergonomically arranged on said display screen so as to cause the apex of each of said touch-sensitive fields to be directed outwardly toward an edge of said display screen.

* * * * *